United States Patent
Gull et al.

(10) Patent No.: US 11,055,137 B2
(45) Date of Patent: Jul. 6, 2021

(54) CPU SCHEDULING METHODS BASED ON RELATIVE TIME QUANTUM FOR DUAL CORE ENVIRONMENTS

(71) Applicant: Imam Abdulrahman Bin Faisal University, Dammam (SA)

(72) Inventors: Hina Gull, Dammam (SA); Sardar Zafar Iqbal, Dammam (SA); Saqib Saeed, Dammam (SA); Mohammed A. Alqahtani, Dammam (SA); Yasser A. Bamarouf, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 273 days.

(21) Appl. No.: 16/406,511

(22) Filed: May 8, 2019

(65) Prior Publication Data
US 2020/0356410 A1    Nov. 12, 2020

(51) Int. Cl.
*G06F 9/48* (2006.01)
*G06F 9/38* (2018.01)
*G06F 17/11* (2006.01)
*G06F 13/28* (2006.01)
*G06F 9/30* (2018.01)

(52) U.S. Cl.
CPC .......... *G06F 9/4887* (2013.01); *G06F 9/3001* (2013.01); *G06F 9/3877* (2013.01); *G06F 13/28* (2013.01); *G06F 17/11* (2013.01)

(58) Field of Classification Search
CPC .... G06F 13/28; G06F 17/11; G06F 2209/483; G06F 2209/486; G06F 9/3001; G06F 9/3877; G06F 9/4887; G06N 10/00
See application file for complete search history.

(56) References Cited

U.S. PATENT DOCUMENTS

2014/0245304 A1    8/2014    Zheng et al.

FOREIGN PATENT DOCUMENTS

CN    1821954 A    8/2006

OTHER PUBLICATIONS

H.S. Behera, Reena Kumari Naik, Suchilagna Parida, Improved Multilevel Feedback Queue Scheduling Using Dynamic Time Quantum and Its Performance Analysis, 2012, (IJCSIT) International Journal of Computer Science and Information Technologies, vol. 3(2) (Year: 2012).*

S. K. Dwivedi and R. Gupta, "A simulator based performance analysis of multilevel feedback queue scheduling," 2014 International Conference on Computer and Communication Technology (ICCCT), Allahabad, India, 2014, pp. 341-346, doi: 10.1109/ICCCT.2014.7001516. (Year: 2014).*

(Continued)

*Primary Examiner* — Jorge A Chu Joy-Davila
(74) *Attorney, Agent, or Firm* — Oblon, McClelland, Maier & Neustadt, L.L.P.

(57) ABSTRACT

The present disclosure is directed to dual core processor scheduling based on relative time quantum. A time quantum is calculated by taking the average of the process burst times for each roughly half portion of a ready queue list and then applying addition and subtraction to the relative values. A first CPU is assigned the quantum based on addition while the second CPU is assigned the quantum based on subtraction.

16 Claims, 18 Drawing Sheets

(56) References Cited

OTHER PUBLICATIONS

Rafi U., Zia M.A., Razzaq A., Ali S., Saleem M.A. (2018) Multi-Queue Priority Based Algorithm for CPU Process Scheduling, Proceedings of the Eleventh International Conference on Management Science and Engineering Management. ICMSEM 2017. (Year: 2017).*

M. Thombare, R. Sukhwani, P. Shah, S. Chaudhari and P. Raundale, "Efficient implementation of Multilevel Feedback Queue Scheduling," 2016 International Conference on Wireless Communications, Signal Processing and Networking (WiSPNET), Chennai, India, 2016, pp. 1950-1954, (Year: 2016).*

Panda, et al.; A New Proposed Two Processor Based CPU Scheduling Algorithm with Varying Time quantum for Real Time Systems; Journal of Global Research in Computer Science, vol. 2, No. 4; Apr. 2011; 7 Pages.

Gull, et al.; Design and Evaluation of CPU Scheduling Algorithms Based on Relative Time Quantum: Variations of Round Robin Algorithm; Journal of Computational and Theoretical Nanoscience, vol. 15, No. 8; pp. 2483-2488; Aug. 2018; Abstract Only; 2 Pages.

\* cited by examiner

| P1 | P2 | P3 | P4 | P5 | P2 |
|---|---|---|---|---|---|
0　　　2　　　　　　17　　　　22　　　25　　27　　　　34

*FIG. 2C*

```
C:\WINDOWS\system32\cmd.exe

Enter Number of Process: 5

Enter Burst Time for 1 : 2
Enter Burst Time for 2 : 22
Enter Burst Time for 3 : 5
Enter Burst Time for 4 : 3
Enter Burst Time for 5 : 2
Relative Value of List1 r1: 12
Relative Value of List2 r2: 3
15

Process      Burst Time      Waiting Time      Turn Around Time
p1               2                 0                  2
p2              22                12                 34
p3               5                17                 22
p4               3                22                 25
p5               2                25                 27

Average Waiting Time: 15.2
Average Turn Around Time: 22
```

*FIG. 2D*

| P1 | P2 | P3 | P4 | P5 | P2 | P2 |
|----|----|----|----|----|----|----|
0    2    11   16   19 21        30   34

*FIG. 3C*

```
C:\WINDOWS\system32\cmd.exe

Enter Number of Process: 5

Enter Burst Time for 1 : 2
Enter Burst Time for 2 : 22
Enter Burst Time for 3 : 5
Enter Burst Time for 4 : 3
Enter Burst Time for 5 : 2
Relative Value of List1 r1: 12
Relative Value of List2 r2: 3
9

Process    Burst Time    Waiting Time    Turn Around Time
p1         2             0               2
p2         22            12              34
p3         5             11              16
p4         3             16              19
p5         2             19              21

Average Waiting Time: 11.6
Average Turn Around Time: 18.4
```

*FIG. 3D*

CPU SCHEDULING METHODS BASED ON RELATIVE TIME QUANTUM FOR DUAL CORE ENVIRONMENTS

STATEMENT OF PRIOR DISCLOSURE

Aspects of this technology are described in an article "Design and Evaluation of CPU Scheduling Algorithms Based on Relative Time Quantum: Variations of Round Robin Algorithm" published in Journal of Computational and Theoretical Nanoscience, Vol. 15, No. 8, pp. 2483-2488, on Aug. 1, 2018, which is incorporated herein by reference in its entirety.

BACKGROUND

Technical Field

The present disclosure is directed to dual core processor scheduling based on a relative time quantum. In one aspect the time quantum is calculated by taking the average of the process burst times for each half of a ready queue list and then applying addition and subtraction to the relative values. A first CPU is assigned the quantum based on addition while the second CPU is assigned the quantum based on subtraction.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In the field of computing resources, resource optimization is an area which needs constant improvement. With the advent of cloud computing environments and big data applications, improved computing resource usage is required. The traditional approaches of process scheduling need to be further improved.

An operating system is a program that manages the hardware part of the computer. It is an intermediary program between the user and the computer. Processing unit (PU) scheduling is of high interest in multiprogramming operating systems, as by switching the CPU between different processes (also called content switching), the performance and efficiency of a computer can be enhanced. This field has further gained importance due to the emergence of architectural frameworks such as cloud computing, service oriented architectures, mobile computing etc. (See A. Silberschatz, P. B. Galvin, and G. Gagne, "CPU Scheduling, Operating System Concepts", 9th Ed., Wiley Publishers (2012), p. 972; Y. Li, M. Chen, W. Dai, and M. Qiu, IEEE Systems Journal 11, 96 (2017); A. Tchernykh, "Scheduling algorithms for distributed cosmic ray detection using Apache Mesos", High Performance Computing: Third Latin American Conference, CARLA 2016, Mexico City, Mexico, August-September, April, Springer, 2016, Revised Selected Papers (2017), Vol. 697, p. 359; R. Tyagi and S. K. Gupta, "A survey on scheduling algorithms for parallel and distributed systems", Silicon Photonics and High Performance Computing, Springer, Singapore (2018), pp. 51-64; H. G. Tani and C. El Amrani, Journal of Data Mining and Digital Humanities, Special Issue on Scientific and Technological Strategic Intelligence (2016); P. Thakur and M. Mahajan, International Journal of Modern Computer Science 5 (2017); and M. A. Rodriguez and R. Buyya, "Concurrency and Computation: Practice and Experience 29" (2017), each incorporated herein by reference in their entirety).

CPU scheduling involves complex mechanisms which assign CPUs to multiple processes directed to a CPU. Some traditional CPU scheduling algorithms are now described.

A processor-based CPU scheduling (TPBCS) algorithm, in which one processor is exclusively assigned to CPU-intensive processes and the other processor is exclusively assigned to I/O-intensive processes has been used in the past. This approach dispatches the processes to the appropriate processor according to their percentage of CPU or I/O requirement. After the processes are dispatched to respective processors, the time quantum is calculated randomly, and the processes are executed in an increasing order of their burst time. (See H. S. Behera, Jajnaseni Panda, Dipanwita Thakur and Subasini Saho, "A New Proposed Two Processor Based CPU Scheduling Algorithm with Varying Time quantum for Real Time Systems", incorporated herein by reference in its entirety).

First-Come-First-Serve (FCFS) is a CPU scheduling algorithm which assigns a CPU to the process which comes first in the ready queue. This algorithm is non-preemptive in nature and is considered as the simplest technique applied. FCFS is a widely used scheduling methodology, but also has shortcomings. If a process is too long, the process has to wait at the end of the queue, and not get time in the CPU. (See Md. Mamunur Rashid and Md. Nasim Adhtar, Journals of Applied Sciences 6, 2036 (2009), incorporated herein by reference in its entirety).

Another known algorithm is priority based scheduling, which works by assigning priorities to each process. Each process in a ready queue is assigned priority based on certain criteria. Highest priority jobs/processes are given to the CPU first, following the processes with low priority. Some of the processes arrive with equivalent priority; their scheduling is decided by a first come first serve methodology. (See I. Singh Rajput and D. Gupta, J. Adv. Eng. Technol. 2, 120 (2013), incorporated herein by reference in its entirety).

Another widely used algorithm is known as shortest job first. This algorithm works by selecting the process which has shortest time requirement for the CPU. The advantage of this approach is that its turnaround time is less for most processes, but starvation may occur. (See S. Shukla and L. Kishore, International Journal of Engineering, Management and Sciences (IJEMS) 1 (2014), incorporated herein by reference in its entirety).

The most widely used scheduling algorithm is Round Robin. This algorithm uses FCFS and is preemptive. A small time quantum is assigned to each process and then a time slice is taken for each process. As the time quantum for a particular process expires, the CPU is forcefully assigned to the next process in the ready queue, thus using context switching. The turnaround time of this process depends upon the size of the time quantum assigned. This algorithm also offers some shortcomings in terms of its average waiting time, which may be high due to the application of context switching and FCFS. (See Qudsia Mateen, Ujala Niazi, Marwah, and Sobia Khalid, International Journal of Computer and Communication System Engineering (IJCCSE) 2, 139 (2015), incorporated herein by reference in its entirety).

Another CPU scheduling technique is known as multilevel queue scheduling. Multilevel queue scheduling divides the workload of the processes into different queues. This algorithm differs from other techniques by using different scheduling algorithms on each of the queues. A process in the ready queue is assigned priority based on its status, whether it is a foreground process or a background process. Foreground processes are given high priority while background processes are assigned as low priority. High priority processes are placed in the upper queues. These queues are given priority over queues having background processes. Process(es) jump from one queue to another based on its assigned scheduling algorithm.

Another similar technique which works on the mechanism of multilevel queue scheduling is multilevel feedback queue scheduling. A similar process is followed, but in this technique the scheduler keeps analyzing the behavior of the process and, based on the behavior, the algorithm changes the priority of the processes, going from high to lower level priority processes.

A variation of round robin algorithm has been proposed, in which the round robin algorithm changes the time quantum to a dynamic time quantum. (See M. V. Ahamad, *International Journal of Advanced Research in Computer Science* 8 (2010), incorporated herein by reference in its entirety).

In a previous work by the instant inventors, a variation of round robin was presented in which the time quantum assigned to each process was the average of the two middle processes. (See Saeeda Bibi, Farooque Azam, Sameera Amjad, Wasi Haider Butt, Hina Gull, Rashid Ahmed, and Yasir Chaudhry, "An Efficient SJRR CPU Scheduling Algorithm", International Journal of Computer Science and Information Security 8(2) (2010), https://www.scribd.com/document/32950807/An-Efficient-SJRR-CPU-Scheduling-Algorithm, incorporated herein by reference in its entirety).

In an aspect of the present disclosure, the two CPUs of a dual core processor each perform mixed jobs, none of which is exclusively dedicated to either I/O is CPU intensive. All jobs/processes are divided between the CPUs based on their sequence in the processor queue. The difference between the present disclosure and previous scheduling techniques is in the calculation of the time quantum.

In the present disclosure, the time quantum is calculated by taking the average of the process burst time for each half of a ready queue list and then applying addition and subtraction to the relative values. One CPU is directed to use a scheduling technique having a quantum based on the added values while other is directed to use a scheduling technique having a quantum based on the subtracted values. Thus, a dual core performs both tasks simultaneously based on different scheduling techniques. Both scheduling techniques have been simulated and given random burst time. Simulation results have been compared with the round robin scheduling method. The simulation results demonstrate that scheduling performance is significantly improved as compared to that of traditional round robin scheduling.

SUMMARY

In an exemplary embodiment, a scheduling method for use in process scheduling in a dual core computer is disclosed. The method includes dividing a ready queue of P processes into a first list of n processes and a second list of m processes, where n+m equals P, averaging the burst times of the processes in each list, adding the averages to generate a first quantum and subtracting the averages to generate a second quantum, assigning the first quantum to a first CPU of the dual core computer; and assigning the second quantum to a second CPU of the dual core computer.

In another exemplary embodiment, a scheduling system for use in a dual core computer is disclosed. The system includes an input/output device which receives process requests and outputs processing results, a ready queue which receives processes P from the I/O device, each process having a predetermined burst time, B, a scheduler which has circuitry configured to divide the ready queue into a first list of n processes and a second list of m processes, where n+m equals P, an averager which averages burst times of the processes in each list, a summer which adds the averages to generate a first quantum, a subtraction module which determines the absolute value of the difference between the average values and generates a second quantum, and an assignment module for assigning a process $P_i(n)$ from the first list to a first CPU and a process $P_j(m)$ from the second list to a second $CPU_2$, where i=1, 2, . . . , n, j=1, 2, . . . , m and i+j=P.

In another exemplary embodiment, a non-transitory computer readable medium having instructions stored therein that, when executed by one or more processor, cause the one or more processors to perform a method of scheduling in a dual core computer, comprising dividing a ready queue of P processes into a first list of n processes and a second list of m processes, where n+m equals P, averaging the burst times of the processes in each list, adding the averages to generate a first quantum and subtracting the averages to generate a second quantum, assigning the first quantum to a first CPU of the dual core computer; and assigning the second quantum to a second CPU of the dual core computer.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 2C illustrates the Gantt chart of Algorithm 1.

FIG. 2D illustrates the simulation of Algorithm 2.

FIG. 3C illustrates the Gantt chart of Algorithm 2.

FIG. 3D illustrates the simulation of Algorithm 2.

DETAILED DESCRIPTION

Figure 1:
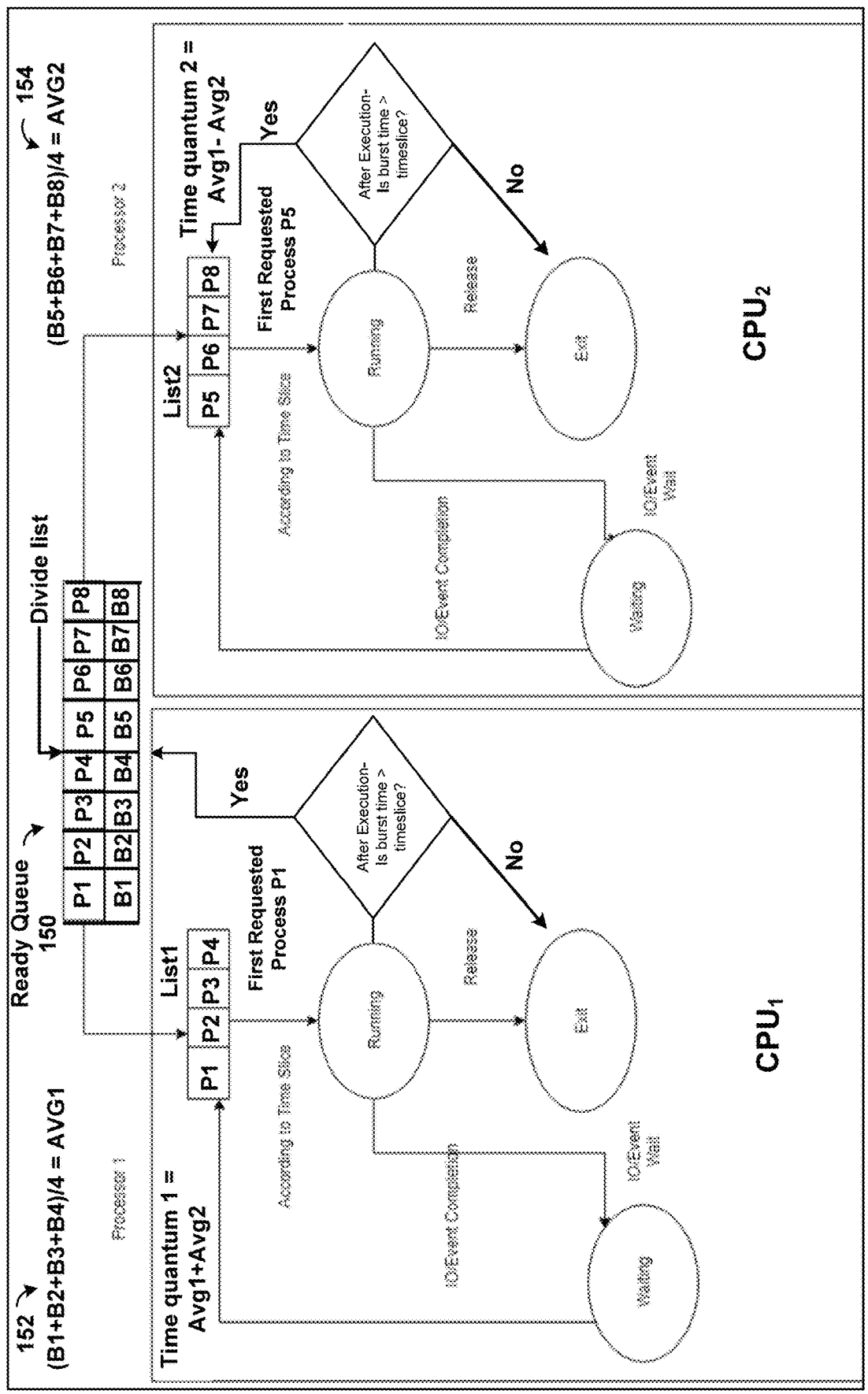
FIG. 1 illustrates processes in a dual core computing system.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

The term "quantum" refers to the period of time for which a process is allowed to run uninterrupted in a preemptive multitasking operating system.

The term "time slice" refers to a short interval of time allotted to each user or program in a multitasking or time-sharing system. Time slices are typically in milliseconds.

The term "ready list" or "run queue" keeps a list of all processes that are ready to run. Each of these processes is assigned a "burst time".

The term "burst time" refers to the amount of time needed to run a process in the ready list.

The term "turnaround time" is the total time the CPU takes to complete execution of a process that is assigned to it by the scheduler.

The term "waiting time" is the time a process stays in a waiting state, residing in the ready queue, before it is assigned to the CPU.

The term "response time" is the time measured from when the process requests the CPU for the first time; i.e., the process submits its request for the CPU upon the first response it receives from the CPU.

Aspects of this disclosure are directed to a scheduling method for use in process scheduling in a dual core computer, a scheduling system for use in a dual core computer, and a non-transitory computer readable medium having instructions stored therein that, when executed by one or more processor, cause the one or more processors to perform a method of scheduling in a dual core computer.

Most computing systems have a large number of processes with short CPU bursts interspersed between I/O requests and a small number of processes with long CPU bursts. To provide good time-sharing performance, a running process may be preempted to let another one run.

The ready list in the operating system keeps a list of all processes that are ready to run and are not blocked at input/output or by a blocking system request. The entries in this list are pointers to a process control block, which stores all information and states of a process. A "ready" process is one which has been loaded into main memory and is awaiting execution on a CPU (to be context switched onto the CPU by the dispatcher, or a short-term scheduler). There may be many "ready" processes at any one point of the system's execution. For example, in a one-processor system, only one process can execute at any one time, and all other "concurrently executing" processes must wait for execution.

When an I/O request for a process is complete, the process moves from the waiting state to the ready state and gets placed on a ready queue.

CPU scheduling is the job of a scheduler residing inside a CPU, called a short-term scheduler or just a CPU scheduler. The CPU scheduler selects a process from the ready queue and assigns it to CPU when CPU becomes idle. The scheduler makes decisions about the processes based on certain conditions when the process switches between different states as follows:

i. Running to waiting: The current process goes from the running state to the waiting state because it issues an I/O request or some operating system request that cannot be satisfied immediately.

ii. Running to ready: A timer interrupt causes the scheduler to run and decide that a process has run for its allotted interval of time and it is time to move the process from the running state to the ready state.

iii. Waiting to ready: An I/O operation is complete for a process that requested it and the process now moves from the waiting to the ready state. The scheduler may then decide to preempt the currently-running process and move this newly-ready process into the running state.

iv. Process terminates.

CPU schedulers use CPU scheduling algorithms specially designed for the scheduling of the processes. Different CPU scheduling algorithms have different characteristics.

Selection of an algorithm may prioritize one process over the other. Throughout its life, a process keeps moving between different queues. The process switches between a ready queue and the input/output (I/O) queue. The ready queue contains the processes that are ready for the CPU, while the I/O queue contains those processes which are waiting for an input/output device response.

CPU scheduling is divided into two major types; preemptive scheduling and non-preemptive scheduling. Non-preemptive conditions occur when the process stops, terminates or transits from its running state to the waiting state. Preemptive scheduling conditions occur when the process changes its state from running to ready or from waiting to ready. A scheduler is a preemptive scheduler if it has the ability to get invoked by an interrupt and move a process out of a running state to let another process run. If a scheduler cannot take the CPU away from a process then it is a cooperative, or non-preemptive scheduler. Aspects of the present disclosure use a preemptive scheduling algorithm.

When a process is first created, it occupies the "created" or "new" state. In this state, the process awaits admission to the "ready" state. Admission will be approved or delayed by a long-term, or admission, scheduler. Typically in most desktop computer systems, this admission will be approved automatically. However, for real-time operating systems this admission may be delayed. In a real-time system, admitting too many processes to the "ready" state may lead to over-saturation and over-contention of the system's resources, resulting in an inability to meet process deadlines.

Modern computers are capable of running many different programs or processes at the same time. A single core computer having only one CPU is only capable of handling one process at a time.

Dual core environments optimize the computing performance by multitasking. In the present disclosure, two CPU scheduling techniques based on a relative time quantum are presented. The time quantum is calculated by taking the average of the process burst time for each half of a ready queue list and then applying addition and/or subtraction to the relative values. One CPU is directed to use a scheduling technique having a quantum based on the added values while other is directed to use a scheduling technique having a quantum based on the subtracted values. Thus, a dual core may run two processes simultaneously, each based on different scheduling techniques.

In an aspect of the present disclosure, two different CPU algorithms are used to schedule processing in a dual core environment. In conventional round robin scheduling, the time quantum is assigned randomly. In the present disclosure, a modification of round robin scheduling is used in which the ready list is divided into two portions, the burst times are averaged for each list, then the relative (averaged values) values are added (Algorithm 1) and subtracted (Algorithm 2) to generate a first and second time quantum as described below. A time quantum is assigned to each process and a CPU is designated to handle the process. In a dual core processor, one CPU is assigned to use scheduling based on an addition technique while other is assigned to use scheduling based on a subtraction technique. As a result, the performance of the processing is improved in terms of average waiting and turnaround time in comparison to traditional round robin scheduling techniques.

As illustrated in FIG. 1, the ready queue 150 is divided into two lists. One list will be assigned to $CPU_1$ while the other list will be assigned to $CPU_2$. The list may be divided in half or one list may have more processes than the other. In general, the list may be divided roughly in half by the order of the processes in the queue. Each process has a predetermined burst time. The burst times of the processes in each list are summed and averages of the burst times are calculated i.e. $average_1$ 152, (average of burst times of all processes in $CPU_1$) and $average_2$ 154 (average of burst times of all processes in $CPU_2$). In $CPU_1$, the time slice is calculated based on summing both averages, i.e. $average_1 + average_2$, while in $CPU_2$, the time slice is calculated based on subtraction, i.e. $average_1 - average_2$. Based on this calculated time slice, a first requested process (P1) from list 1 will move into the running state in $CPU_1$ and a first requested process (P5) from list 2 will move into the running state in $CPU_2$. After execution, if the remaining burst time of either of the processes is greater than the time slice of the CPU in which it is running, the process is added to the tail of the queue of its respective list, otherwise the process will exit. In the situation in which an I/O interruption or event occurs, the process goes into the waiting state. After I/O or event completion, the process will again be added to the ready queue. Although only eight processes are shown in FIG. 1, the number of processes is not limited to eight, and new processes may be continuously added to the process queue. However, each original list fully processes before the timeslice is recalculated with the newly added processes.

The above technique is preemptive. The scheduler can use the summing technique on both cores, the subtracting technique on both cores or the summing technique on a first core and the subtracting techniques on a second core.

The left side of FIG. 1 illustrates using Algorithm 1, which describes the summing technique to generate the time quantum. The right side of FIG. 1 illustrates using Algorithm 2, which describes the subtraction technique to generate the time quantum. Both of these algorithms are described in more detail below. Although Algorithm 1 and Algorithm 2 are applied to a dual core processor in the current aspect, either algorithm may be used in a single core processor.

The summing aspect for the above technique is shown by the pseudo code shown in Algorithm 1.

---

Algorithm 1

```
sumlist1←0
sumlist2←0
avg1←0
avg2←0
quantum←0
m←length/2
avg1←sumlist1/m
avg2←sumlist2/(n−m)
quantum←avg1+avg2
sum←0
AvgWait←0
AvgTurn←0
    DO
    FOR i←0 to length
        if bursttime[i] > quantum
            then bursttime[i] −=quantum
        FOR j ←0 to length
            Then if j! = i && bursttime[j]! = 0
            Then waitingtime[j]+=quantum
        ELSE
            FOR j ←0 to length
            Then if j!= i && bursttime[j]! = 0
                Then waitingtime[j]+=bursttime[i]
        bursttime[i]←0
        FOR k←0 to length
        sum←sum+bursttime[k]
    while sum !=0
        FOR l←0 to length
        turnaroundtime[i]←waitingtime[i]+process[i]
        FOR j ←0 to length
        AvgWait+=waitingtime [j]
        FOR j ←0 to length
        AvlgTurn+=turnaroundtime[j]
```

--- where len=burst time array, q=timeslice, wt(j)=waiting time array, tat[ ]=turn around time array, process[ ]=processes array.

Algorithm 1 works by dividing the list of processes present in the ready queue roughly into halves to form two lists. The relative value of the burst times of each list is then calculated based on its average. The sum of the average from each of the two lists will be the time quantum for each process. When the process is assigned to a CPU it will run only for the time equal to the time quantum. In RR (Round Robin), when the time quantum expires, the CPU switches to the next process. In algorithm 1, as the timeslice expires, context switching will occur and the CPU will be assigned to the next job in the queue. Thus, this algorithm also solves the problem of starvation in the shortest job algorithm, as the CPU is not given to the jobs that have greater burst time for a long time.

Figure 2A:
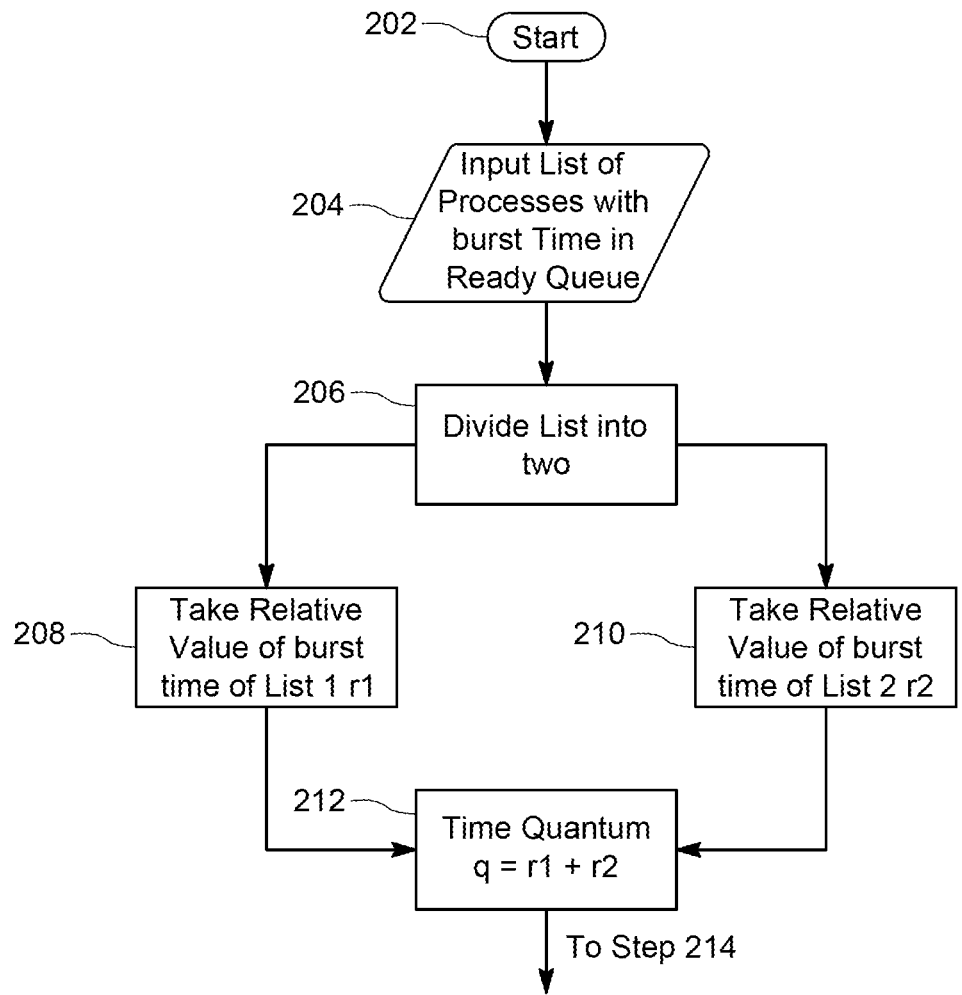
FIG. 2A, 2B are a flowchart of Algorithm 1.
Figure 2B:
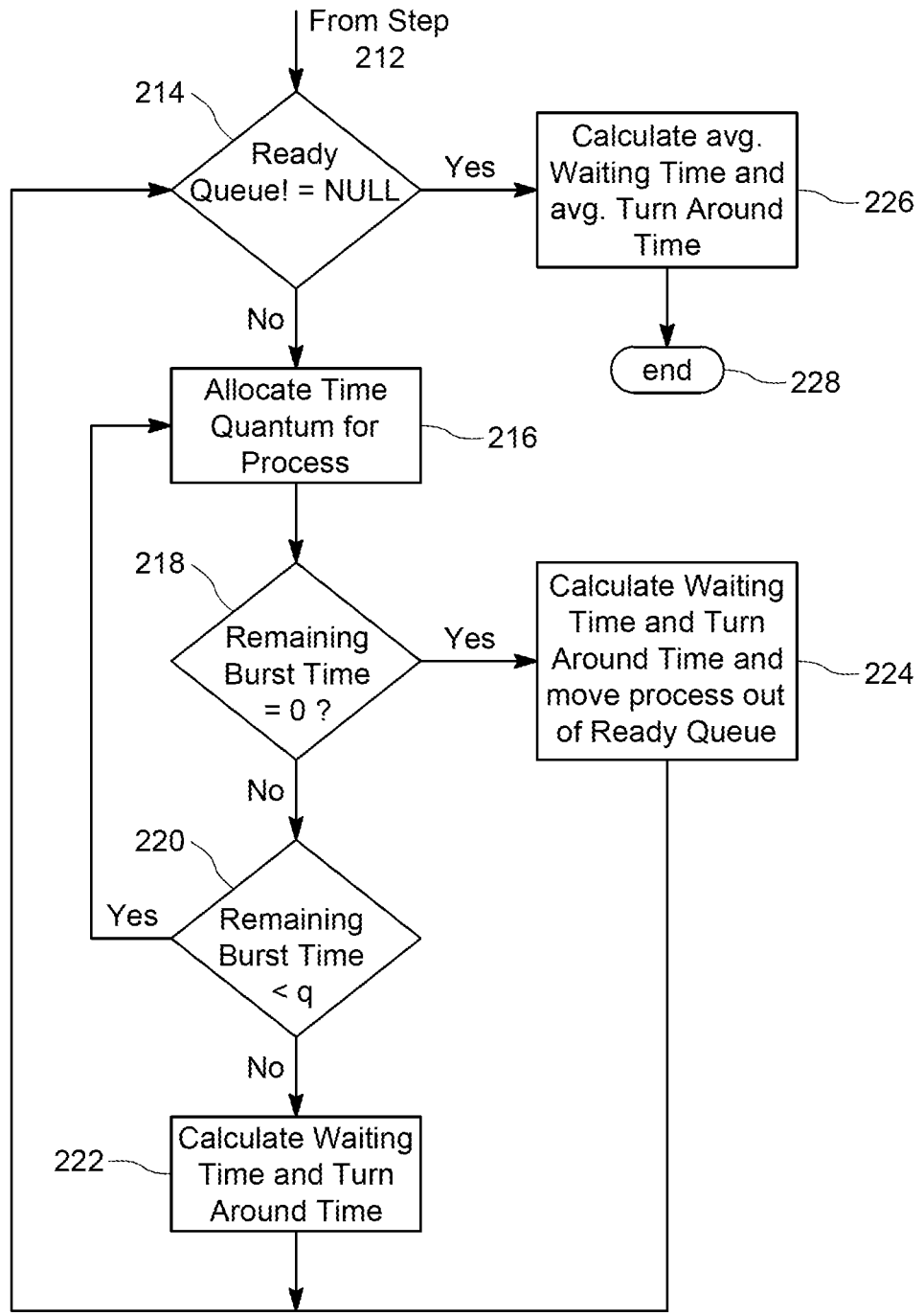

A flowchart illustrating the steps of Algorithm I is shown in FIG. 2A, 2B and described below.

Step 202: Access the list of processes and respective burst times which are ready to be assigned to the CPU.

Step 206: Divide the list into halves.

Step 208: Calculate the relative value which is the average value of the burst times in list 1 to obtain AVG1.

Step 210: Calculate the relative value which is the average value of the burst time in list 2 to obtain AVG2.

Step 212: Sum AVG1 and AVG2 to get one specific value and assign this value to the time quantum.

Step 214: Initialize the waiting time of each process as zero.

Step 216: Assign the time quantum to each process, and then take the time slice for each process.

Step 218: Start with the first process in the queue.

Step 220: When the time quantum of the first process expires, assign the CPU to the next process in the ready queue (context switching).

Steps 220-228: This process continues, until all processes finish.

A non-limiting example of using algorithm 1 is now described using burst times from Table 1.

TABLE I

Processes and their burst time.

| Process | Burst time |
|---------|------------|
| P1 | 2 |
| P2 | 22 |
| P3 | 5 |
| P4 | 3 |
| P5 | 2 |

Step No. 1: Divide the list given in Table I into two portions. List 1 will contain processes P1 and P2, while list 2 contains processes P3, P4 and P5.

Step No. 2: Calculate the relative value of each list by averaging the burst times of the processes in the list. In this case relative values will be r1=12 and r2=3 respectively.

Step No. 3: Sum the relative values to obtain time quantum q such that q=r1+r2. In this example, q=15.

Step No. 4: Assign the time quantum to each process and assign the CPU to run the first process in the ready queue.

Step No. 5: Waiting time for each process:

P1: 0
P2: 12
P3: 17
P4: 22
P5: 25

Average waiting time: (0+12+17+22+25)/5=15.2
Average Turnaround Time: (2+34+22+25+27)/5=22

Figure 2C:
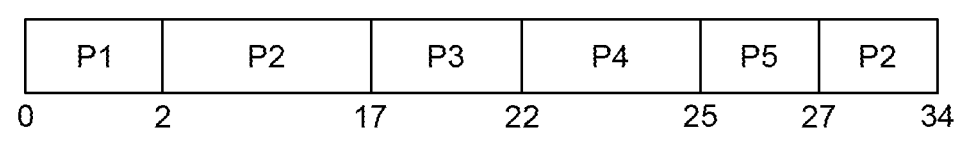

FIG. 2C shows the Gantt chart for this example of using Algorithm 1.

Algorithm 1 was implemented in C# using a visual studio program. The waiting and turnaround times for each process were calculated and then average waiting and average turnaround times were calculated. The results are shown in FIG. 2D.

Algorithm 2 describes the subtraction technique to generate the time quantum. Algorithm 2 works similarly to Algorithm 1, in which the list of processes present in the ready queue are divided into two halves. Again, the relative value of each list is calculated separately based on its average. However, the time quantum is calculated differently. In Algorithm 2, the value of time quantum is the difference of the two averages. The pseudo code for the subtraction aspect is shown below.

Algorithm 2

```
sumlist1←0
sumlist2←0
avg1←0
avg2←0
quantum←0
m←length/2
avg1←sumlist1/m
avg2←sumlist2/(n-m)
quantum←avg1-avg2
sum←0
AvgWait←0
AvgTurn←0
    DO
        FOR i←0 to length
            if bursttime[i] > quantum
                then bursttime[i] -=quantum
```

-continued

Algorithm 2

```
            FOR j←0 to length
                Then if j! = i && bursttime[j]! = 0
                Then waitingtime[j]+=quantum
            ELSE
                FOR j←0 to length
                Then if j! = i && bursttime[j]! = 0
                Then waitingtime[j]+=bursttime[i]
    bursttime[i]←0
        FOR k←0 to length
        sum←sum+bursttime[k]
    while sum !=0
        FOR l←0 to length
        turnaroundtime[i] ←waitingtime[i]+process[i]
        FOR j ←0 to length
        AvgWait+=waitingtime [j]
        FOR j ←0 to length
        AvgTurn+= turnaroundtime[j]
```

Figure 3A:
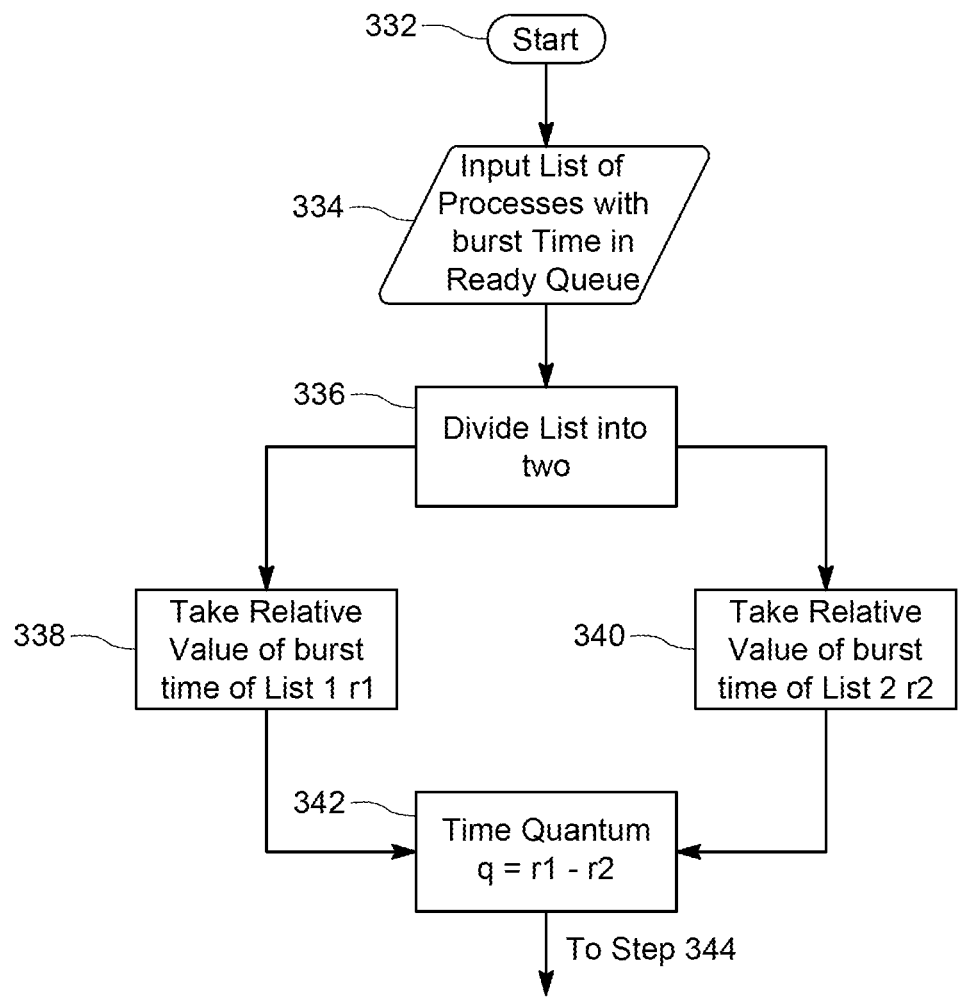
FIG. 3A, 3B are a flowchart of Algorithm 1.
Figure 3B:
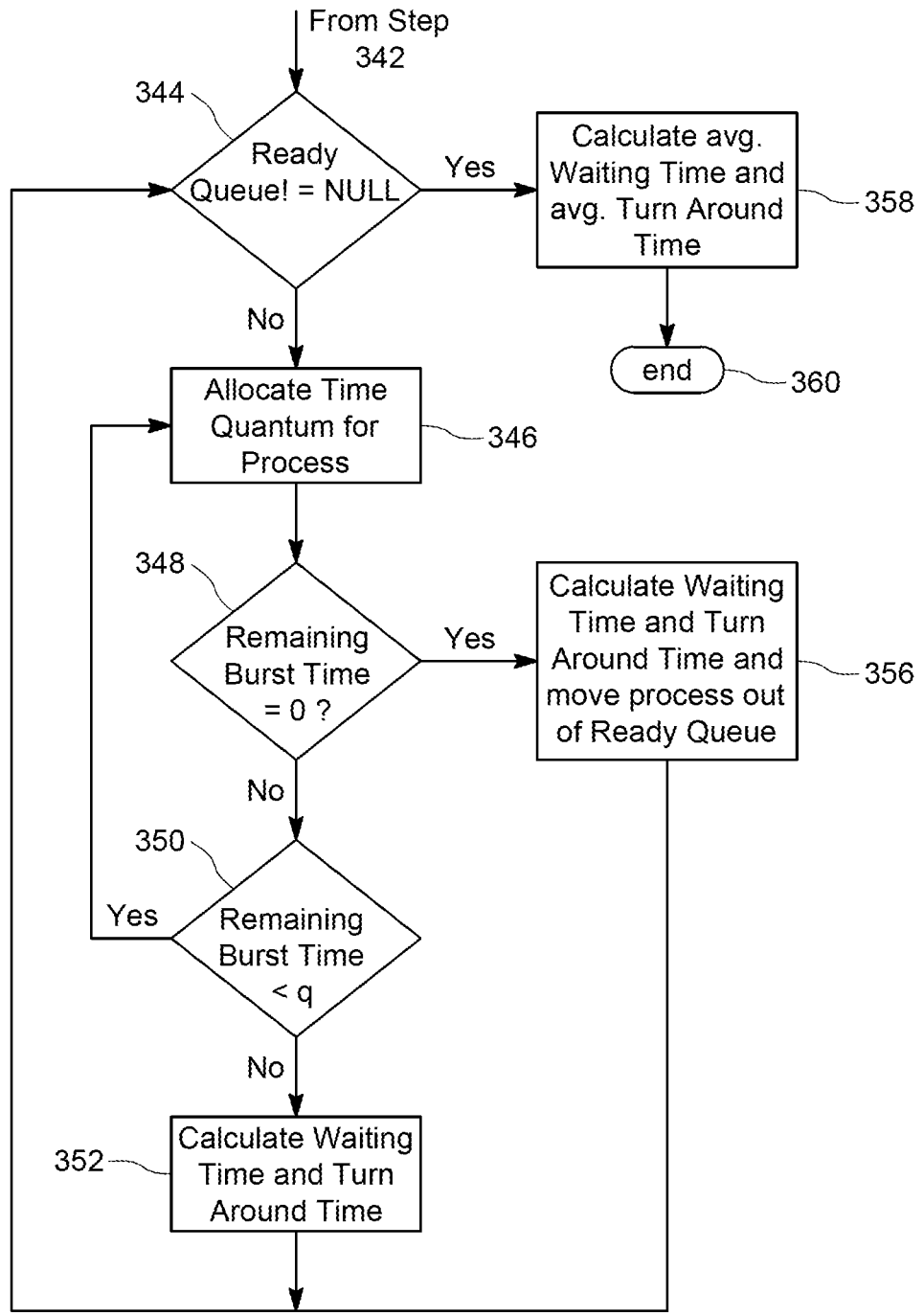

A flowchart illustrating the steps of Algorithm 2 is shown in FIG. 3A, 3B and described below.

Step 332: Access the list of processes and respective burst times which are ready to be assigned to the CPU.

Step 334: Divide the list into halves.

Step 336: Calculate the relative value which is the average value of the burst times in list1 to obtain AVG1.

Step 338: Calculate the relative value which is the average value of the burst time in list2 to obtain AVG2.

Step 340: Subtract AVG2 from AVG1 to get one specific value and assign this value to the time quantum.

Step 344: Initialize the waiting time of each process as zero.

Step 346: Assign the time quantum to each process, and then take the time slice for each process.

Step 348: Start with the first process in the queue.

Step 332: When the time quantum of the first process expires, assign the CPU to the next process in the ready queue (context switching).

Step 332: This process continues, until all processes finish.

Figure 3C:
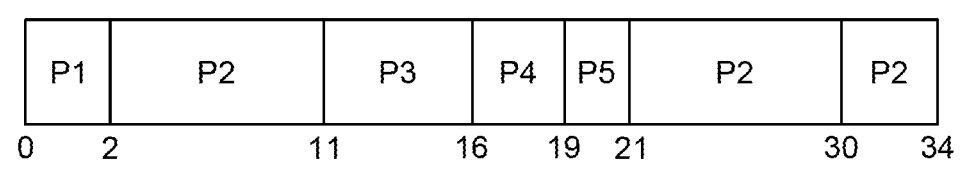

A non-limiting example of using algorithm 1 is now described using burst times from Table 1. The Gantt chart is shown in FIG. 3C.

Step No. 1: Divide the list given in Table I into two portions. List 1 will contain processes P1 and P2, while list 2 contains processes P3, P4 and P5.

Step No. 2: Calculate the relative value of each list by averaging the burst times of the processes in the list. In this case relative values will be r1=12 and r2=3 respectively.

Step No. 3: Subtract the relative values to get time quantum q such as; q=r2-r2. In this example, q=9.

Step No. 4: Assign the time quantum to each process and assign the CPU to run the first process in the ready queue.

Step No. 5: Waiting time for each process:

P1: 0
P2: 12
P3: 11
P4: 16
P5: 19

Average waiting time: (0+12+11+16+19)/5=11.6
Average Turnaround Time: (2+34+16+19+21)/5=18

Simulation results are shown in FIG. 3D showing the results for the calculations of the waiting and turnaround times and their averages.

Figure 4A:
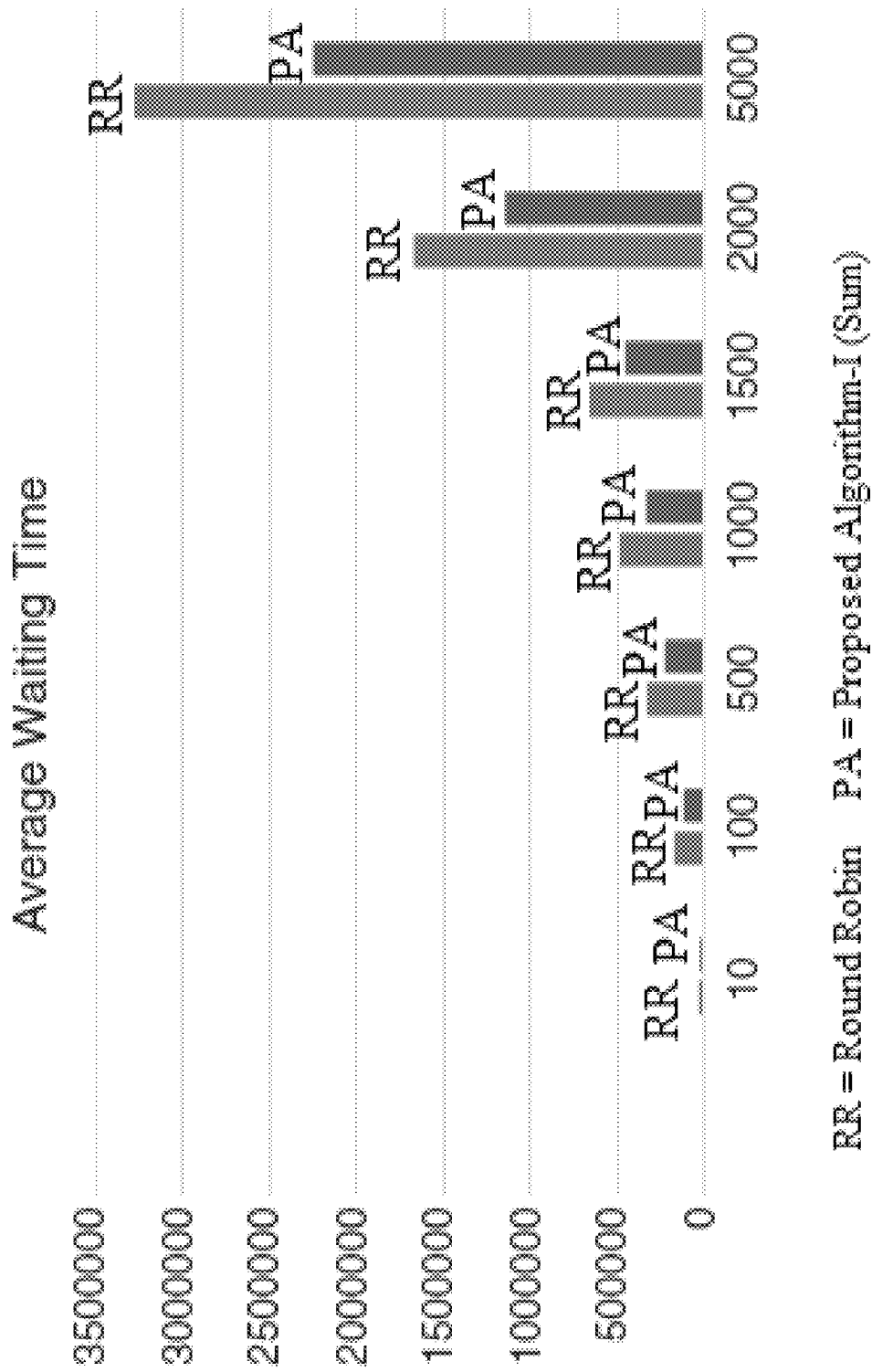
FIG. 4A is a graph depicting the average waiting time comparison between algorithm 1 and the round robin algorithm.
Figure 4B:
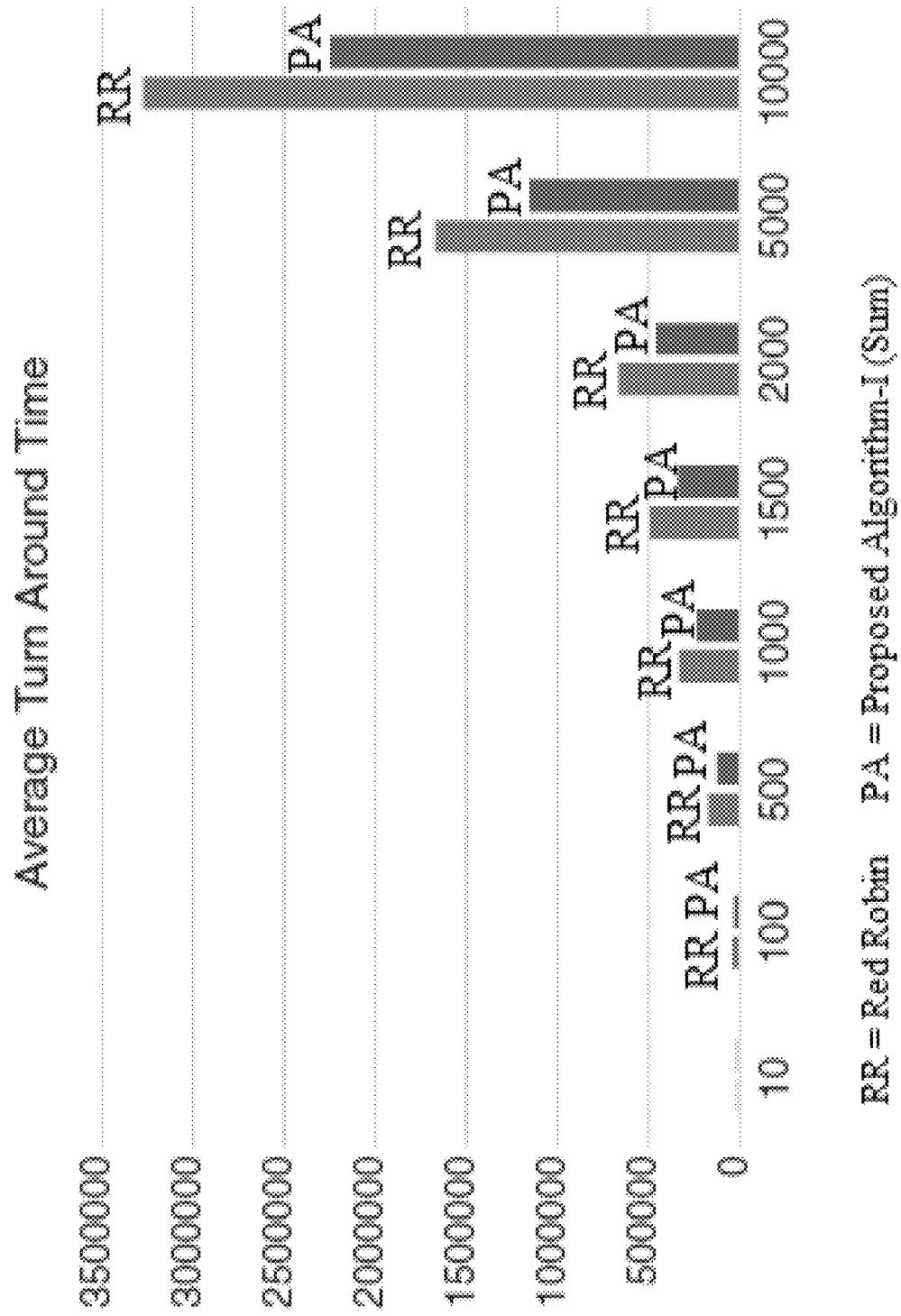
FIG. 4B is a graph depicting the average turnaround time comparison between algorithm 1 and the round robin algorithm.

The simulation results for both algorithm 1 and algorithm 2 were compared with results using the Round Robin algorithm. All three algorithms were implemented in C# using a visual studio program. Simulation of the three algorithms was created by assigning a number of simulated number of processes and gradually increasing this number of processes. FIG. 4A show the average waiting times using Algorithm 1 as compared with the average waiting times using the Round Robin algorithm. As shown in the figure, the initial number of processes was 10 and this number was gradually increased to 5000. FIG. 4B shows where the number of processes was increased to 100000. Random burst times were assigned to each process. For consistency, the same numbers of processes and burst times are applied in comparing three algorithms. On the y-axes, the average waiting times (FIG. 4A, 5A) and average turnaround times (FIG. 4B, 5B) are plotted. The results are as follows:

Average Waiting Time

Figure 5A:
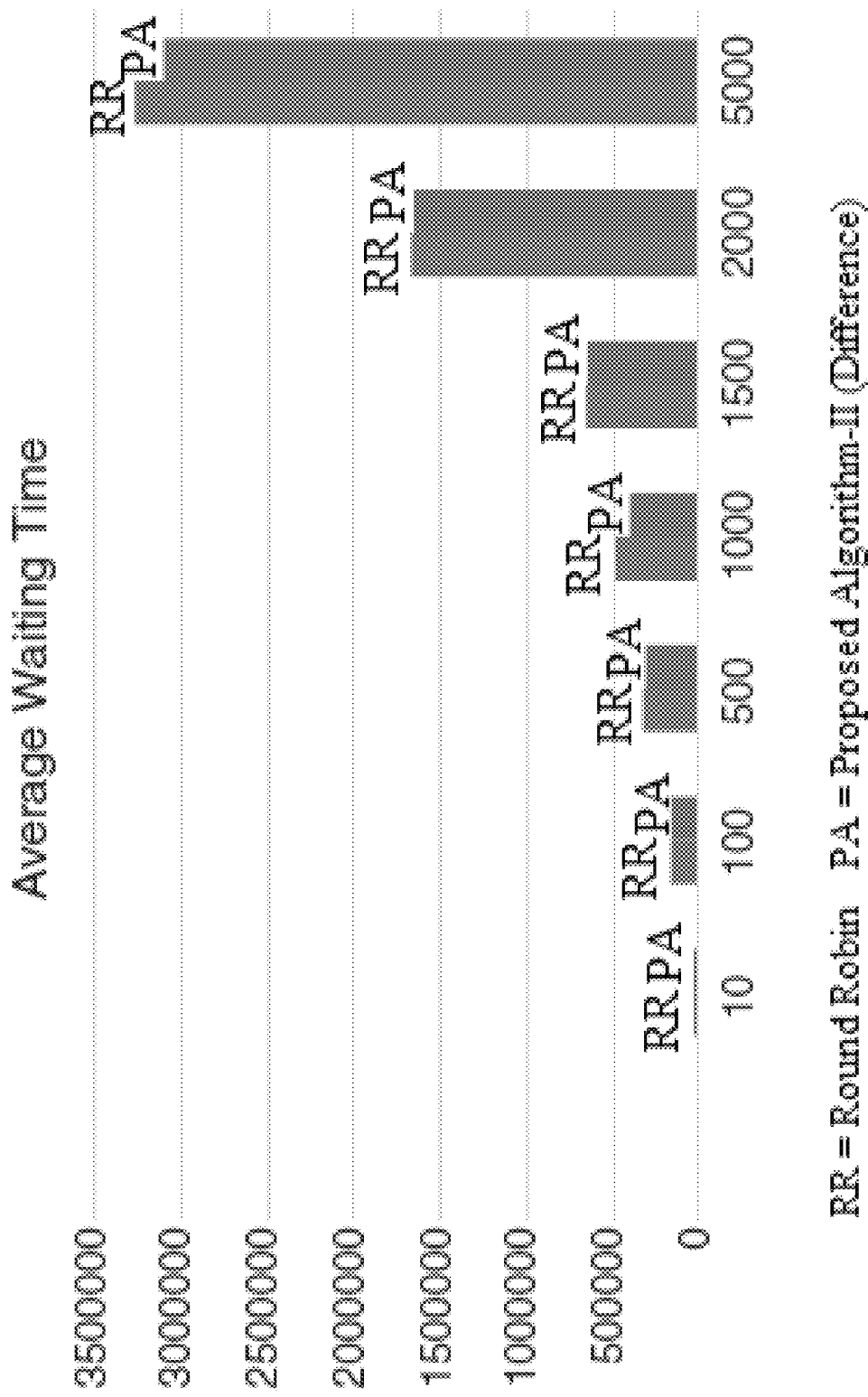
FIG. 5A is a graph depicting the average waiting time comparison between algorithm 2 and the round robin algorithm.

The numbers of processes were plotted on the x-axis, while waiting time was plotted on the y-axis in FIG. 4A, 5A. Referring to FIG. 4A, it is shown that average waiting times (PA) using Algorithm 1 are less than average waiting times (RR) using the traditional round robin algorithm. This means that processes have to wait less time in the ready queue when using the Algorithm 1 technique. Referring to FIG. 5A, Algorithm 2 shows similar performance to the traditional round robin algorithm at lower process numbers. As the number of processes increases Algorithm 2 performs better than the round robin algorithm, showing less average waiting time.

Average Turnaround Time

Figure 5B:
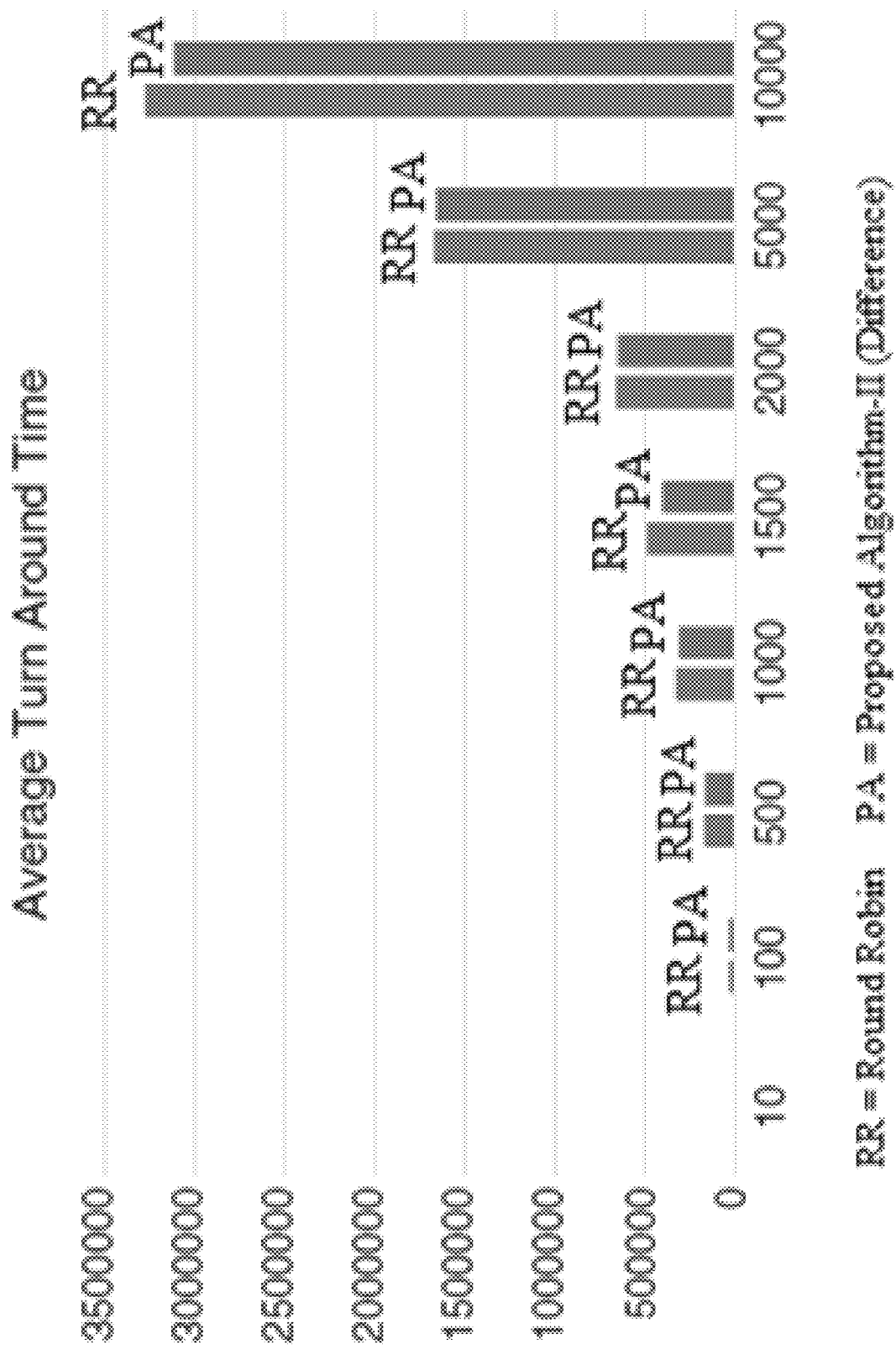
FIG. 5B is a graph depicting the average turnaround time comparison between algorithm 2 and the round robin algorithm.

FIG. 4B, 5B are plots which compare the average turnaround time for Algorithms 1 and 2 with the Round Robin algorithm. The numbers of processes are on the x-axis, while turnaround time is plotted on the y-axis. FIG. 4B shows that Algorithm 1 produces significantly lower average turn around time than does the Round Robin algorithm. Although the average turn around time using Algorithm 2 is approximately the same as that of the Round Robin algorithm for lower process numbers, high process numbers show some improvement in turn around time as shown in FIG. 5B.

Figure 6:
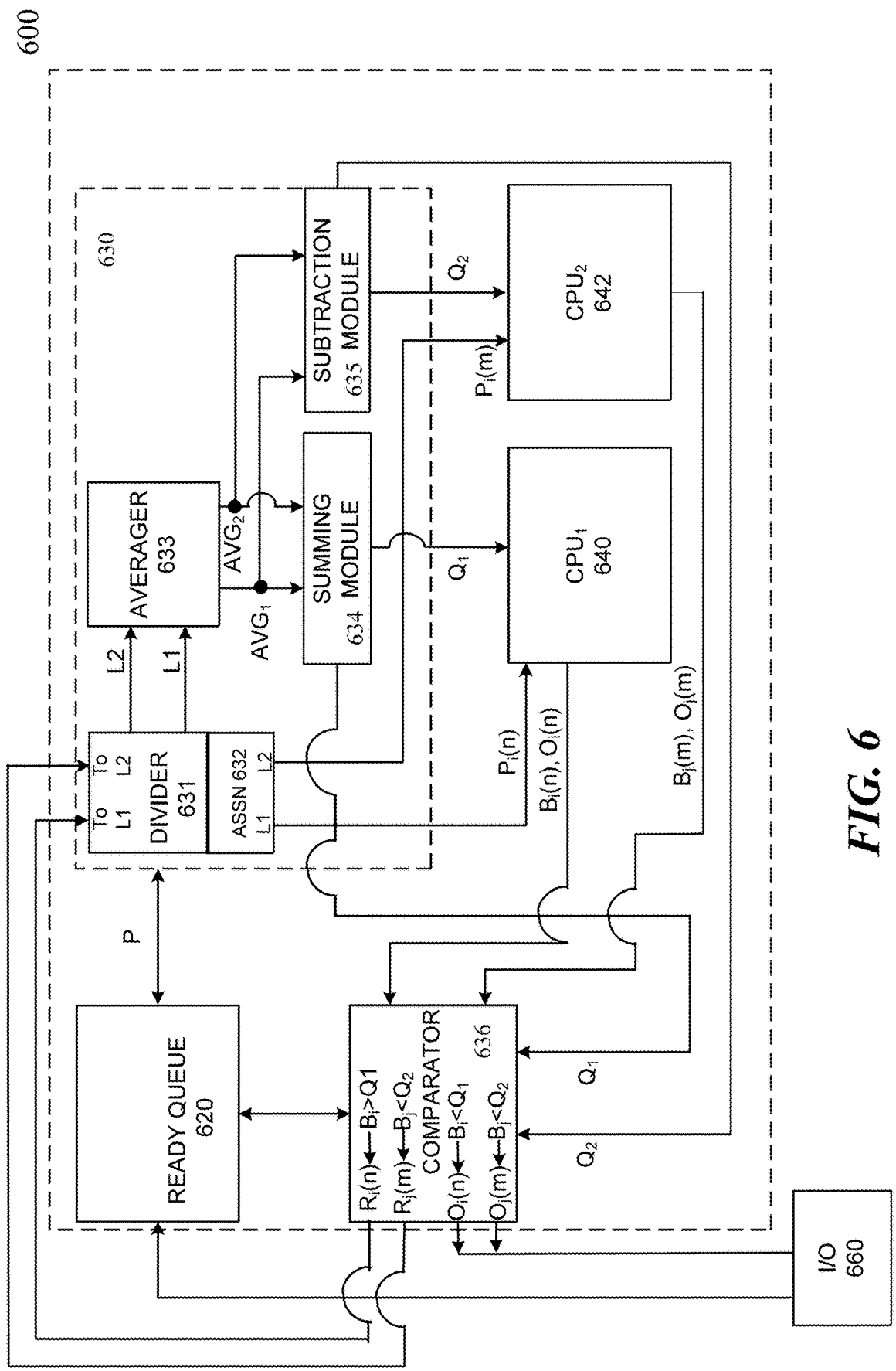
FIG. 6 illustrates a dual core scheduling environment.

FIG. 6 illustrates a dual core computer system which may use Algorithms 1 and 2 to schedule processes. FIG. 6 shows an I/O device 660 connected to a ready queue 620, which receives processes from the I/O device. A divider 631 is connected to the ready queue 620 to receive the processes. The divider divides the ready queue list of processes roughly in half and sends a first list, $L_1$, and a second list, $L_2$, to an averager 633. The averager outputs a first and second average, $Avg_1$ and $Avg^2$ respectively. Both averages are sent to the summing module 634 and their sum is output as a first quantum, $q_1$ to a first $CPU_1$. Both averages are also sent to the subtraction module 635, where the absolute value of their difference is output as a second quantum, $q_2$, to a second $CPU_2$. An assignment module 632 transmits each process in the first list $L_1$ to $CPU_1$, where it runs until it terminates or for the amount of time, $q_1$. The output, $O_i$ and the burst time, $B_i$ for each $_i$th process in $L_1$ is sent to comparator 636. The comparator determines if the process has terminated, in which case it sends Oi to the I/O device 660. The comparator compares each burst time, Bi, to the quantum $q_1$. If the burst time is greater than the quantum, the remaining process $R_i$ is sent to be added to the tail of $L_1$ to complete processing. Similarly, the assignment module 632 transmits each process in the second list $L_2$ to $CPU_2$, where it runs until it terminates or for the amount of time, $q_2$. The output, $O_j$ and the burst time, $B_j$ for each $_j$th process in $L_2$ is sent to comparator 636. The comparator determines if the process has terminated, in which case it sends Oj to the I/O device 660. The comparator compares each burst time, Bj, to the quantum $q_2$. If the burst time is greater than the quantum, the remaining process $R_j$ is sent to be added to the tail of $L_2$ to complete processing.

The first embodiment is illustrated in FIGS. 1, 2A, 2B, 3A, 3B and 6. The first embodiment describes a scheduling method for use in process scheduling in a dual core computer 600, comprising dividing (see Divider 631, FIG. 6), by a scheduler 630 having circuitry including program instructions configured for calculating, a ready queue 620 of P processes into a first list of n processes, P(n), and a second list of m processes, P(m), wherein each process in each list has a preassigned burst time and n+m=P; averaging (See average 633) the burst times of the n processes in the first list to generate a first relative value, $Avg_1$; averaging the burst times of the m processes in the second list to generate a second relative value $Avg_2$; adding (See summing module 634) the first relative value and the second relative value to generate a first quantum, $q_1$; subtracting (see subtraction module 635) the smaller of the relative values from the larger of the relative values to generate a second quantum, $q_2$; assigning (see assignment module 632), by a scheduler 630 having program instructions configured for assigning quanta to the cores of the dual core computer, the first quantum $q_1$ to a first $CPU_1$ 640; and assigning the second quantum $q_2$ to a second $CPU_2$ 642.

The method further comprises assigning, by the scheduler, a process $P_i(n)$ of the first list to the first $CPU_1$, where i=1, 2, . . . , n as shown in FIG. 1 and FIG. 6; comparing, by using a comparator 636 of the circuitry, the burst time of the process $P_i(n)$ to the first quantum $q_1$. If the burst time of the process $P_i(n)$ is less than the first quantum, running, by $CPU_1$, the process $P_i(n)$ to generate an output, $O_i$ and if the burst time of the process $P_i(n)$ is greater than the first quantum, running the process $P_i(n)$ for a time equal to the first quantum, and adding a remaining burst time of the process $P_i(n)$ to a tail of the first list (see the Yes arrow pointing to the P4 in the ready queue 150, FIG. 1).

The method continues by assigning, by the scheduler, a process $P_j(m)$ of the second list to the second $CPU_2$, where j=1, 2, . . . , m; comparing, by using a comparator 636 of the circuitry, the burst time of the process $P_j(m)$ of the second list to the second quantum $q_2$; if the burst time of the process $P_j(m)$ is less than the second quantum, running, by $CPU_2$, the process $P_j(m)$ to generate an output, $O_j$; if the burst time of the process $P_j(m)$ is greater than the second quantum, running the process $P_j(m)$ for a time equal to the second quantum, and adding a remaining burst time of the process $P_j(m)$ to a tail of the second list (see the Yes arrow pointing to the P8 in the ready queue 150, FIG. 1).

The method iterates the above procedure by assigning, by the scheduler, a second process, $P_{i+1}(n)$, to $CPU_1$; running the second process, $P_{i+1}(n)$, until either the process ends and generates an output $O_{i+1}$ or the quantum $q_1$ expires; transmitting the output $O_{i+1}$ to an I/O port 660 if the process ends or adding the remainder of the second process, $P_{i+1}(n)$, to the tail of the first list if the quantum $q_1$ expires; then assigning each next process of the first list to $CPU_1$, running each next process of the first list, transmitting either the output to an I/O port or adding a remainder of next process to the tail of the first list, until $O_n$ outputs are generated. When $O_n$ outputs have been received at I/O port 660, the first list has been processed.

Similarly as for the first list, the method includes assigning, by the scheduler, a second process, $P_{j+1}(m)$, to $CPU_2$; running the second process, $P_{j+1}(m)$, until either the process ends and generates an output $O_{j+1}$ or the quantum $q_2$ expires; transmitting the output $O_{j+1}$ to an I/O port 660 if the process ends; adding the remainder of the second process, $P_{j+1}(m)$, to the tail of the second list if the quantum $q_2$ expires; then assigning each next process of the second list to $CPU_2$, running each next process of the second list, and transmitting either the output to an I/O port or adding a remainder of next process to the tail of the second list, until $O_m$ outputs are generated. When $O_m$ outputs have been received at I/O port 660, the second list has been processed.

The method continues by assigning, by the assignment module 632 of scheduler 630, a first process $P_1(n)$ of the first list to the first $CPU_1$; simultaneously assigning, by the scheduler, a first process $P_1(m)$ of the second list to the second $CPU_2$; comparing, by using a comparator 636 of the circuitry, the burst time of the process $P_1(n)$ to the first quantum $q_1$. If the burst time of the process $P_1(n)$ is less than the first quantum, running, by $CPU_1$, the process $P_1(n)$ to generate an output, $O_1(n)$ and if the burst time of the process $P_1(n)$ is greater than the first quantum, running the process $P_1(n)$ for a time equal to the first quantum, adding a remaining burst time of the process $P_1(n)$ to a tail of the first list, and assigning a second process $P_2(n)$ from the first list to $CPU_1$; comparing, by using the comparator, the burst time of the process $P_1(m)$ of the second list to the second quantum $q_2$. If the burst time of the process $P_1(m)$ is less than the second quantum, running, by $CPU_2$, the process $P_1(m)$ to generate an output, $O_j(m)$ and if the burst time of the process $P_1(m)$ is greater than the second quantum, running the process $P_1(m)$ for a time equal to the second quantum, adding a remaining burst time of the process $P_1(m)$ to a tail of the second list, and assigning a second process $P_2(m)$ from the second list to $CPU_2$.

The method iterates by assigning each next process $P_i(n)$ of the first list to $CPU_1$; running each next process $P_i(n)$; if $P_i(n)$ terminates, transmitting the output $O_i(n)$ to an I/O port; if $P_i(n)$ does not terminate, adding a remainder of $P_i(n)$ to the tail of the first list; continuing to assign and run each next process until $O_n$ outputs are generated; assigning each next process $P_j(m)$ of the second list to $CPU_2$; running each next process $P_j(m)$; if $P_j(m)$ terminates, transmitting the output $O_j(m)$ to an I/O port; if $P_j(m)$ does not terminate, adding a remainder of $P_j(m)$ to the tail of the second list and continuing to assign and run each next process until $O_m$ outputs are generated.

The second embodiment is illustrated in FIGS. 1, 2A, 2B, 3A, 3B and 6. The second embodiment describes a scheduling system for use in a dual core computer 600, comprising an input/output device, I/O 660, wherein the I/O device receives process requests and outputs processing results; a ready queue 620, wherein the ready queue receives processes P from the I/O device, each process having a predetermined burst time, B; a scheduler 610 including: a divider 630, wherein the divider has circuitry configured to divide the ready queue into two roughly equal portions and outputs the portions as a first list and a second list; an average 632 having circuitry configured to average the burst time of the processes in the first and second lists to generate a first relative value $Avg_1$ and a second relative value $Avg_2$ respectively; a summing module 634 having circuitry configured to add the first relative value and the second relative value and generate a first quantum, $q_1$; a subtraction module 636 having circuitry configured to determine the absolute value of the difference between the relative values and generate a second quantum $q_2$; and an assignment module 632 for assigning a process $P_i(n)$ from the first list to a first $CPU_1$ 610 and a process $P_j(m)$ from the second list to a second $CPU_2$ 642, where $i=1, 2, \ldots, n$, $j=1, 2, \ldots, m$ and $i+j=P$. The lists can be any portion of the ready queue. For example, for a ready queue containing 100 processes, the first list may contain 50 processes (n=50) and the second list may contain 50 processes (m=50). However, the first list may have 25 processes and the second list 75 processes. The designation of n and m and the total number of processes P depends on the types of processes, the overhead of the computing system and other design parameters of the computer and is not limited by the above example. FIG. 4A, 5A shows a range of 0 to 5000 processes which were simulated and FIG. 4B, 5B shows a range of 0 to 10000 processes using the method above. Note that FIG. 4A, 4B, 5A, 5B demonstrate that the method and system detailed above successfully decreases the average waiting times and turn around times of the processing.

The scheduling system further includes a comparator 636 having circuitry configured to receive an output $O_i(n)$ and the burst time $B_i(n)$ for each $P_i(n)$ from the first $CPU_1$, compare the burst time $B_i(n)$ to the first quantum, $q_1$, and determine whether the burst time $B_i(n)$ is greater than the first quantum $q_1$, and if the burst time $B_i(n)$ is greater than the first quantum $q_1$, calculate the remaining burst time $R_i(n)$ of the process $P_i(n)$ and add the remaining burst time $R_i(n)$ to the tail of the first list (see FIG. 1); and if the burst time $B_i(n)$ is less than the first quantum $q_1$, transmit the output $O_i(n)$ to the I/O port 660.

Similarly, the comparator further has circuitry configured to receive an output $O_j(m)$ and the burst time $B_j(m)$ for each $P_j(m)$ from the second $CPU_2$, compare the burst time $B_j(m)$ to the second quantum, $q_2$, and determine whether the burst time $B_j(m)$ is greater than the second quantum $q_2$. If the burst time $B_j(m)$ is greater than the second quantum $q_2$, calculate the remaining burst time $R_j(m)$ of the process $P_j(m)$ and add the remaining burst time $R_j(m)$ to the tail of the second list; and if the burst time $B_j(m)$ is less than the second quantum $q_2$, transmit the output $O_j(m)$ to the I/O port.

The assignment module 632 continues to assign each next process $P_i(n)$ of the first list to $CPU_1$ and run each next process $P_i(n)$. If $P_i(n)$ terminates, the assignment module transmits the output $O_i(n)$ to an I/O port 660 and if $P_i(n)$ does not terminate, the assignment module adds a remainder of $P_i(n)$ to the tail of the first list (see FIG. 1). The assignment module continues to assign and run each next process until $O_n$ outputs are generated, which indicates the processes of the first list have finished running.

The assignment module assigns each next process $P_j(m)$ of the second list to $CPU_2$ and runs each next process $P_j(m)$. If $P_j(m)$ terminates, the scheduler transmits the output $O_j(m)$ to an I/O port and if $P_j(m)$ does not terminate, the scheduler adds a remainder of $P_j(m)$ to the tail of the second list. The assignment module continues to assign and run each next process until $O_m$ outputs are generated, which indicates the processes of the second list have finished running.

A comparator 636 connected to CPU1 and CPU2 makes the determination of whether an output is sent to an I/O port 660 or a remainder of a process is added to the tail of the first or the second list (as shown in FIG. 1).

The assignment module simultaneously assigns a first process $P_1(n)$ from the first list to the first $CPU_1$ and a first process $P_1(m)$ from the second list to the second $CPU_2$, so that the processing of the two lists runs concurrently.

The third embodiment is illustrated in FIGS. 1, 2A, 2B, 3A, 3B and 6. The third embodiment describes a non-transitory computer readable medium having instructions stored therein that, when executed by one or more processor, cause the one or more processors to perform a method of scheduling in a dual core computer. The non-transitory computer readable medium method comprises dividing, by a scheduler having circuitry including program instructions configured for calculating, a ready queue of P processes into a first list of n processes, P(n), and a second list of m processes, P(m), wherein each process in each list has a preassigned burst time and n+m=P; averaging the burst times of the n processes in the first list to generate a first relative value, $Avg_1$; averaging the burst times of the m processes in the second list to generate a second relative value $Avg_2$; adding the first relative value and the second relative value to generate a first quantum, $q_1$; subtracting the smaller of the relative values from the larger of the relative values to generate a second quantum, $q_2$; assigning, by a scheduler having program instructions configured for assigning quanta to the cores of the computing system, the first quantum $q_1$ to a first $CPU_1$ of the dual core computer; and assigning the second quantum $q_2$ to a second $CPU_2$ of the dual core computer.

The non-transitory computer readable medium method further comprises assigning, by the scheduler, a process $P_i(n)$ of the first list to the first $CPU_1$, where i=1, 2, ..., n; comparing, by using a comparator of the circuitry, the burst time of the process $P_i(n)$ to the first quantum $q_1$. If the burst time of the process $P_i(n)$ is less than the first quantum, running, by $CPU_1$, the process $P_i(n)$ to generate an output, $O_i$ and if the burst time of the process $P_i(n)$ is greater than the first quantum, running the process $P_i(n)$ for a time equal to the first quantum, and adding a remaining burst time of the process $P_i(n)$ to a tail of the first list.

The non-transitory computer readable medium method further comprises assigning, by the scheduler, a process $P_j(m)$ of the second list to the second $CPU_2$, where j=1, 2, ..., m; comparing, by using a comparator of the circuitry, the burst time of the process $P_j(m)$ of the second list to the second quantum $q_2$; if the burst time of the process $P_j(m)$ is less than the second quantum, running, by $CPU_2$, the process $P_j(m)$ to generate an output, $O_j$; if the burst time of the process $P_j(m)$ is greater than the second quantum, running the process $P_j(m)$ for a time equal to the second quantum, and adding a remaining burst time of the process $P_j(m)$ to a tail of the second list.

The non-transitory computer readable medium method continues by assigning, by the scheduler, a second process, $P_{i+1}(n)$, to $CPU_1$; running the second process, $P_{i+1}(n)$, until either the process ends and generates an output $O_{i+1}$ or the quantum $q_1$ expires; transmitting the output $O_{i+1}$ to an I/O port if the process ends; adding the remainder of the second process, $P_{i+1}(n)$, to the tail of the first list; assigning each next process of the first list to $CPU_1$, running each next process of the first list, transmitting either the output to an I/O port or adding a remainder of next process to the tail of the first list, until $O_n$ outputs are generated.

The non-transitory computer readable medium method further continues by assigning, by the scheduler, a second process, $P_{j+1}(m)$, to $CPU_2$; running the second process, $P_{j+1}(m)$, until either the process ends and generates an output $O_{j+1}$ or the quantum $q_2$ expires; transmitting the output $O_{j+1}$ to an I/O port if the process ends; adding the remainder of the second process, $P_{j+1}(m)$, to the tail of the second list; assigning each next process of the second list to $CPU_2$, running each next process of the second list, and transmitting either the output to an I/O port or adding a remainder of next process to the tail of the second list, until $O_m$ outputs are generated.

The non-transitory computer readable medium method further continues by assigning, by the scheduler, a first process $P_1(n)$ of the first list to the first $CPU_1$; simultaneously assigning, by the scheduler, a first process $P_1(m)$ of the second list to the second $CPU_2$; comparing, by using a comparator of the circuitry, the burst time of the process $P_1(n)$ to the first quantum $q_1$. If the burst time of the process $P_1(n)$ is less than the first quantum, running, by $CPU_1$, the process $P_1(n)$ to generate an output, $O_1(n)$ and if the burst time of the process $P_1(n)$ is greater than the first quantum, running the process $P_1(n)$ for a time equal to the first quantum, adding a remaining burst time of the process $P_1(n)$ to a tail of the first list, and assigning a second process $P_2(n)$ from the first list to $CPU_1$; and comparing, by using the comparator, the burst time of the process $P_1(m)$ of the second list to the second quantum $q_2$. If the burst time of the process $P_1(m)$ is less than the second quantum, running, by $CPU_2$, the process $P_1(m)$ to generate an output, $O_j(m)$ and if the burst time of the process $P_1(m)$ is greater than the second quantum, running the process $P_1(m)$ for a time equal to the second quantum, adding a remaining burst time of the process $P_1(m)$ to a tail of the second list, and assigning a second process $P_2(m)$ from the second list to $CPU_2$.

The non-transitory computer readable medium method further continues by assigning each next process $P_i(n)$ of the first list to $CPU_1$; running each next process $P_i(n)$; if $P_i(n)$ terminates, transmitting the output $O_i(n)$ to an I/O port; if $P_i(n)$ does not terminate, adding a remainder of $P_i(n)$ to the tail of the first list; continuing to assign and run each next process until $O_n$ outputs are generated; assigning each next process $P_j(m)$ of the second list to $CPU_2$; running each next process $P_j(m)$ and if $P_j(m)$ terminates, transmitting the output $O_j(m)$ to an I/O port.

The present disclosure presents two variations of the round robin algorithm, which improve the performance of traditional round robin approach in terms of average waiting and average turnaround time of processes.

Figure 7:
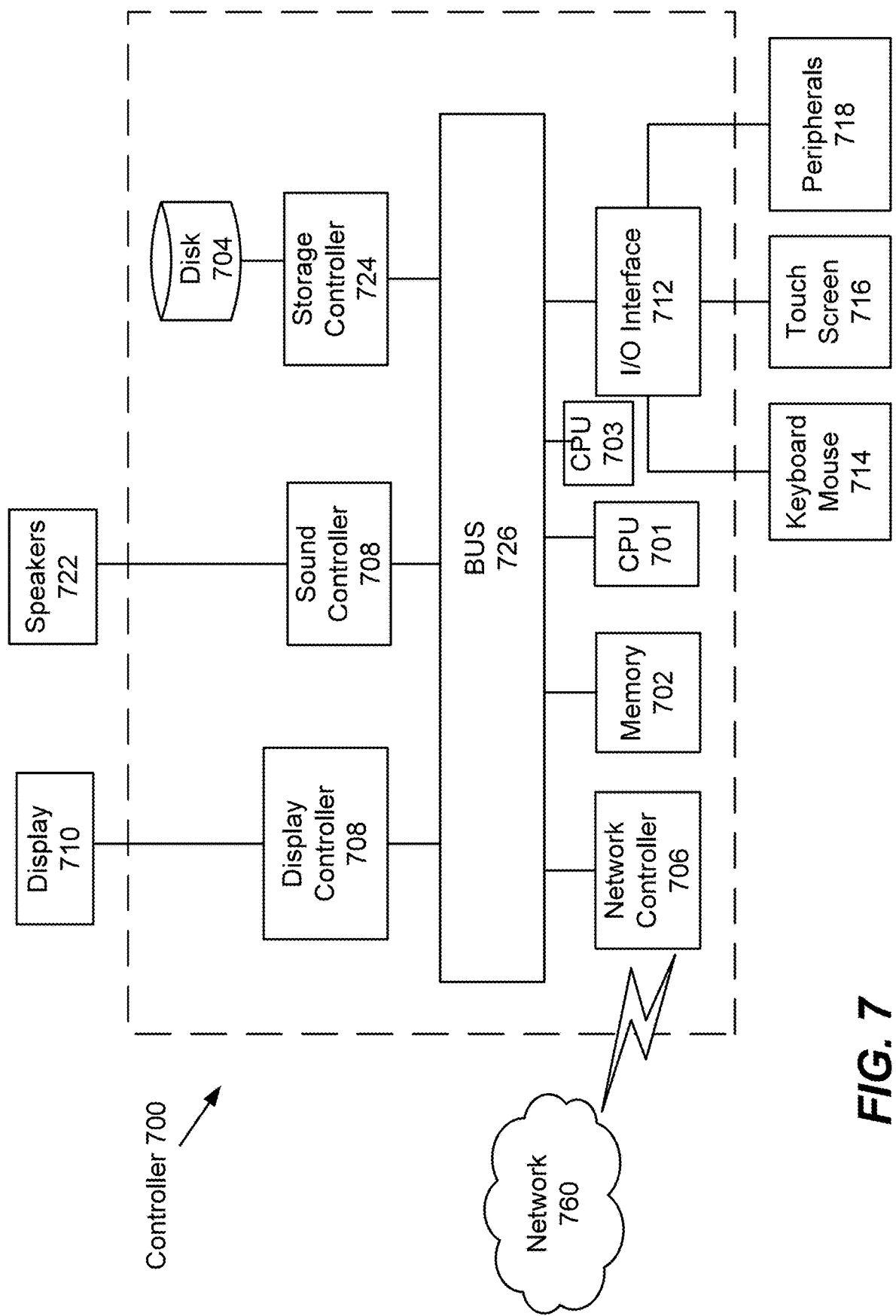
FIG. 7 is an illustration of a non-limiting example of details of computing hardware used in the computing system, according to certain embodiments.

Next, further details of the hardware description of the computing environment of FIG. 6 according to exemplary embodiments is described with reference to FIG. 7. In FIG. 7, a controller 700 is described is representative of dual core computing system 600 of FIG. 6 in which the controller is a computing device which includes a first CPU 701 and a second CPU 703 which performs the processes described above/below. The process data and instructions may be stored in memory 702. These processes and instructions may also be stored on a storage medium disk 704 such as a hard drive (HDD) or portable storage medium or may be stored remotely.

Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claimed advancements may be provided as a utility application, background daemon, or component of an operating system, or combination thereof, executing in conjunction with CPU 701, 703 and an operating system such as Microsoft Windows 7, UNIT, Solaris, LINU7, Apple MAC-OS and other systems known to those skilled in the art.

The hardware elements in order to achieve the computing device may be realized by various circuitry elements, known to those skilled in the art. For example, CPU 701 or CPU 703 may be a Xenon or Core processor from Intel of America or an Opteron processor from AMD of America, or may be other processor types that would be recognized by one of ordinary skill in the art. Alternatively, the CPU 701, 703 may be implemented on an FPGA, ASIC, PLD or using discrete logic circuits, as one of ordinary skill in the art would recognize. Further, CPU 701, 703 may be implemented as multiple processors cooperatively working in parallel to perform the instructions of the inventive processes described above.

The computing device in FIG. 7 also includes a network controller 706, such as an Intel Ethernet PRO network interface card from Intel Corporation of America, for interfacing with network 760. As can be appreciated, the network 760 can be a public network, such as the Internet, or a private network such as an LAN or WAN network, or any combination thereof and can also include PSTN or ISDN sub-networks. The network 760 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 708, such as a NVIDIA GeForce GT7 or Quadro graphics adaptor from NVIDIA Corporation of America for interfacing with display 710, such as a Hewlett Packard HPL2445w LCD monitor. A general purpose I/O interface 712 interfaces with a keyboard and/or mouse 714 as well as a touch screen panel 716 on or separate from display 710. General purpose I/O interface also connects to a variety of peripherals 718 including printers and scanners, such as an OfficeJet or DeskJet from Hewlett Packard.

A sound controller 720 is also provided in the computing device such as Sound Blaster 7-Fi Titanium from Creative, to interface with speakers/microphone 722 thereby providing sounds and/or music.

The general purpose storage controller 724 connects the storage medium disk 704 with communication bus 726, which may be an ISA, EISA, VESA, PCI, or similar, for interconnecting all of the components of the computing device. A description of the general features and functionality of the display 710, keyboard and/or mouse 714, as well as the display controller 708, storage controller 724, network controller 706, sound controller 720, and general purpose I/O interface 712 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 8.

Figure 8:
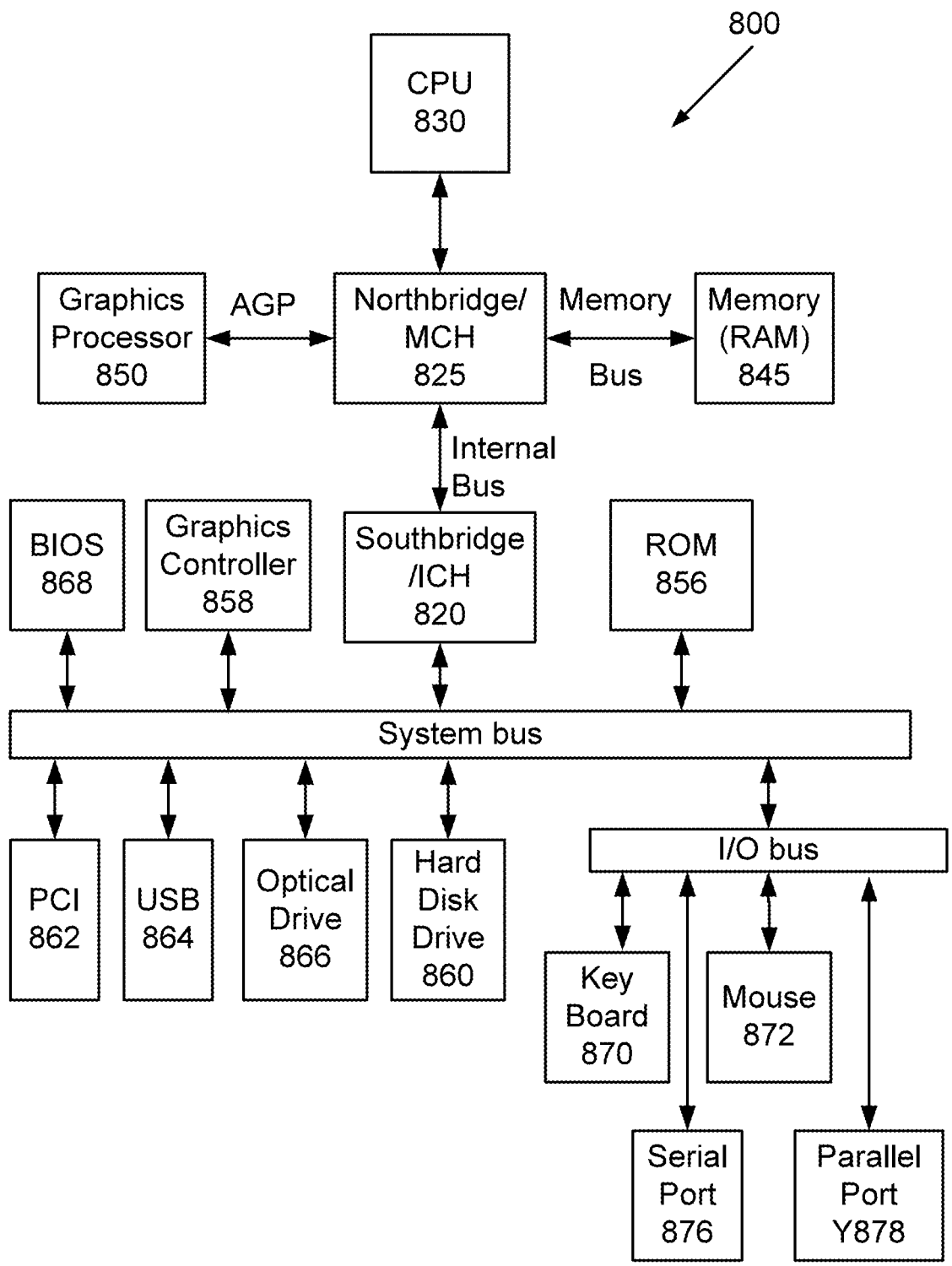
FIG. 8 is an exemplary schematic diagram of a data processing system used within the computing system, according to certain embodiments.

FIG. 8 shows a schematic diagram of a data processing system, according to certain embodiments, for performing the functions of the exemplary embodiments. The data processing system is an example of a computer in which code or instructions implementing the processes of the illustrative embodiments may be located.

In FIG. 8, data processing system 800 employs a hub architecture including a north bridge and memory controller hub (NB/MCH) 825 and a south bridge and input/output (I/O) controller hub (SB/ICH) 820. The central processing unit (CPU) 830 is connected to NB/MCH 825. The NB/MCH 825 also connects to the memory 845 via a memory bus, and connects to the graphics processor 850 via an accelerated graphics port (AGP). The NB/MCH 825 also connects to the SB/ICH 820 via an internal bus (e.g., a unified media interface or a direct media interface). The CPU Processing unit 830 may contain one or more processors and even may be implemented using one or more heterogeneous processor systems.

Figure 9:
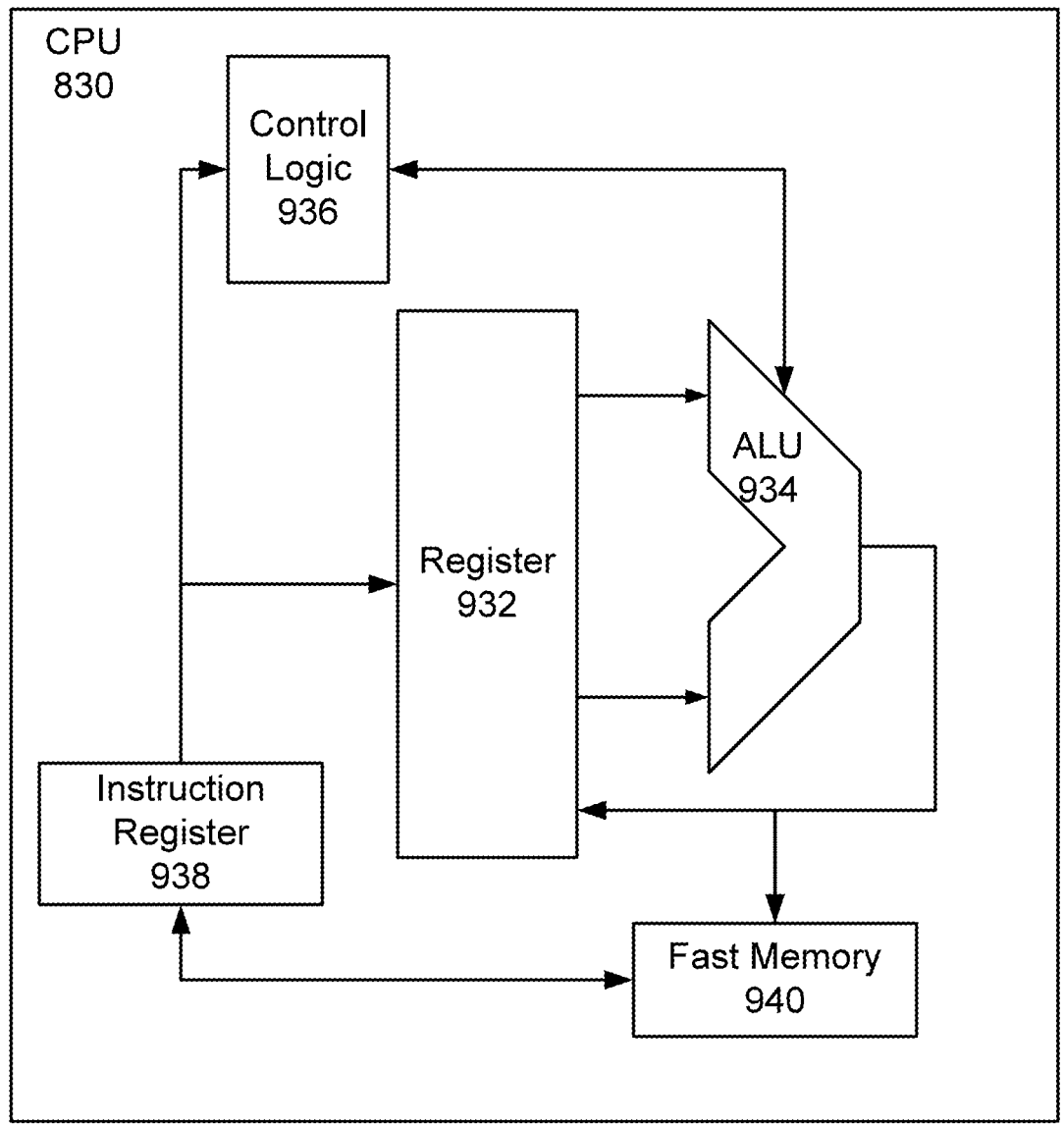
FIG. 9 is an exemplary schematic diagram of a processor used with the computing system, according to certain embodiments.

For example, FIG. 9 shows one implementation of CPU 830. In one implementation, the instruction register 938 retrieves instructions from the fast memory 940. At least part of these instructions are fetched from the instruction register 938 by the control logic 936 and interpreted according to the instruction set architecture of the CPU 830. Part of the instructions can also be directed to the register 932. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 934 that loads values from the register 932 and performs logical and mathematical operations on the loaded values according to the instructions. The results from these operations can be feedback into the register and/or stored in the fast memory 940. According to certain implementations, the instruction set architecture of the CPU 830 can use a reduced instruction set architecture, a complex instruction set architecture, a vector processor architecture, a very large instruction word architecture. Furthermore, the CPU 830 can be based on the Von Neuman model or the Harvard model. The CPU 830 can be a digital signal processor, an FPGA, an ASIC, a PLA, a PLD, or a CPLD. Further, the CPU 830 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 8, the data processing system 800 can include that the SB/ICH 820 is coupled through a system bus to an I/O Bus, a read only memory (ROM) 856, universal serial bus (USB) port 864, a flash binary input/output system (BIOS) 868, and a graphics controller 858. PCI/PCIe devices can also be coupled to SB/ICH 888 through a PCI bus 862.

The PCI devices may include, for example, Ethernet adapters, add-in cards, and PC cards for notebook computers. The Hard disk drive 860 and CD-ROM 866 can use, for example, an integrated drive electronics (IDE) or serial advanced technology attachment (SATA) interface. In one implementation the I/O bus can include a super I/O (SIO) device.

Further, the hard disk drive (HDD) 860 and optical drive 866 can also be coupled to the SB/ICH 820 through a system bus. In one implementation, a keyboard 870, a mouse 872, a parallel port 878, and a serial port 876 can be connected to the system bus through the I/O bus. Other peripherals and devices that can be connected to the SB/ICH 820 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 10:
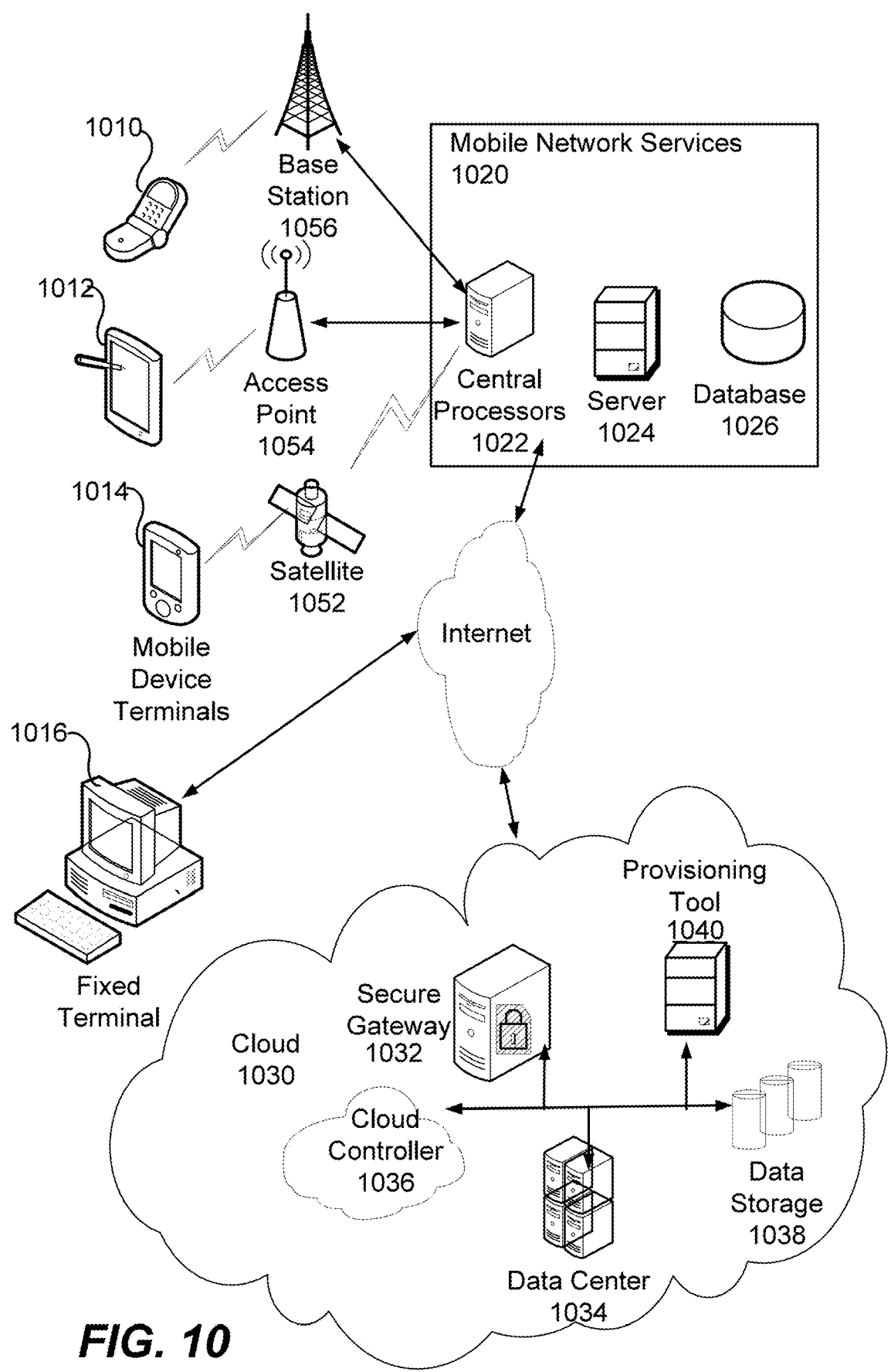
FIG. 10 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 10, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A scheduling method for use in process scheduling in a dual core computer, comprising:
dividing, by a scheduler having circuitry including program instructions configured for calculating, a ready queue of P processes into a first list of n processes, P (n), and a second list of in processes, P (m), wherein each process in each list has a preassigned burst time and n+m=P;
averaging the burst times of the n processes in the first list to generate a first relative value, $Avg_1$;
averaging the burst times of the m processes in the second list to generate a second relative value $Avg_2$;
adding the first relative value and the second relative value to generate a first quantum, $q_1$;
subtracting the smaller of the relative values from the larger of the relative values to generate a second quantum, $q_2$;
assigning, by a scheduler having program instructions configured for assigning quanta to the cores of the dual core computer, the first quantum $q_1$ to a first $CPU_1$;
assigning the second quantum $q_2$ to a second $CPU_2$;
assigning, by the scheduler, a process $P_i$ (n) of the first list to the first $CPU_1$ and a process $P_i$ (m) of the second list to the second $CPU_2$ simultaneously, where i=1, 2, ..., n;
running, by the first $CPU_1$, the assigned process $P_i$ (n) of the first list when determined, by a comparator of the circuitry, that the burst time of the process $P_i$ (n) is less than the first quantum $q_1$, to generate an output $O_i$;
if the burst time of the process $P_i$ (n) is greater than the first quantum $q_1$, running the process $P_i$ (n) for a time equal to the first quantum $q_1$, and adding a remaining burst time of the process $P_1(n)$ to a tail of the first list
running, by the second $CPU_2$, the assigned process $P_i$ (m) of the second list when determined, by the comparator of the circuitry, that the burst time of the process $P_j(m)$ is less than the second quantum $q_2$, to generate an output $O_j$; and
if the burst time of the process $P_j(m)$ is greater than the second quantum $q_2$, running the process $P_j(m)$ for a time equal to the second quantum $q_2$, and adding a remaining burst time of the process $P_j(m)$ to a tail of the second list.

2. The scheduling method of claim 1, further comprising assigning, by the scheduler, a second process, $P_{i+1}(n)$, to $CPU_1$;
running the second process, $P_{i+1}(n)$, until either the process ends and generates an output $O_{i+1}$ or the quantum $q_1$, expires;
transmitting the output $O_{i+1}$ to an I/O port if the process ends;
adding the remainder of the second process, $P_{i+1}(n)$, to the tail of the first list if the quantum q, expires;
assigning each next process of the first list to $CPU_1$, running each next process of the first list, transmitting either the output to an I/O port or adding a remainder of next process to the tail of the first list, until $O_n$ outputs are generated.

3. The scheduling method of claim 1, further comprising assigning, by the scheduler, a second process, $P_{j+1}(m)$, to $CPU_2$;
running the second process, $P_{j+1}(m)$, until either the process ends and generates an output $O_{j+1}$ or the quantum $q_2$ expires;
transmitting the output $O_{j+1}$, to an I/O port if the process ends;
adding the remainder of the second process, $P_{j+1}(m)$, to the tail of the second list if the quantum $q_2$ expires;
assigning each next process of the second list to $CPU_2$, running each next process of the second list, and transmitting either the output to an I/O port or adding a remainder of next process to the tail of the second list, until $O_m$, outputs are generated.

4. The scheduling method of claim 1, further comprising assigning, by the scheduler, a first process $P_1(n)$ of the first list to the first $CPU_1$;
simultaneously assigning, by the scheduler, a first process $P_1(m)$ of the second list to the second $CPU_2$;
comparing, by using a comparator of the circuitry, the burst time of the process $P_1(n)$ to the first quantum $q_1$,
if the burst time of the process $P_1(n)$ is less than the first quantum, running, by $CPU_1$, the process $P_1(n)$ to generate an output, $O_1(n)$;
if the burst time of the process $P_1(n)$ is greater than the first quantum, running the process $P_1(n)$ for a time equal to the first quantum, adding a remaining burst time of the process $P_1(n)$ to a tail of the first list, and assigning a second process $P_2(n)$ from the first list to $CPU_1$;
comparing, by using the comparator, the burst time of the process $P_1(m)$ of the second list to the second quantum $q_2$;
if the burst time of the process $P_1(m)$ is less than the second quantum, running, by $CPU_2$, the process $P_1(m)$ to generate an output, $O_j(m)$;
if the burst time of the process $P_1(m)$ is greater than the second quantum, running the process $P_1(m)$ for a time equal to the second quantum, adding a remaining burst time of the process $P_1(m)$ to a tail of the second list, and assigning a second process $P_2(m)$ from the second list to $CPU_2$.

5. The scheduling method of claim 4, further comprising assigning each next process $P_i(n)$ of the first list to $CPU_1$;
running each next process $P_i(n)$;
if $P_i(n)$ terminates, transmitting the output $O_i(n)$ to an I/O port;
if $P_i(n)$ does not terminate, adding a remainder of $P_i(n)$ to the tail of the first list;
continuing to assign and run each next process until $O_n$ outputs are generated;

assigning each next process $P_j(m)$ of the second list to $CPU_2$;

running each next process $P_j(m)$;
  if $P_j(m)$ terminates, transmitting the output $O_j(m)$ to an I/O port;
  if $P_j(m)$ does not terminate, adding a remainder of $P_j(m)$ to the tail of the second list;

continuing to assign and run each next process until $O_m$ outputs are generated.

6. A scheduling system for use in a dual core computer, comprising:
  a memory storing instructions;
  at least one CPU coupled with the memory which executes the instructions to implement:
  an input/output device, I/O, wherein the I/O device receives process requests and outputs processing results;
  a ready queue, wherein the ready queue receives processes P from the I/O device, each process having a predetermined burst time, B; a scheduler including:
  a divider, wherein the divider has circuitry configured to divide the ready queue into two roughly equal portions and outputs the portions as a first list and a second list;
  an averager having circuitry configured to average the burst time of the processes in the first and second lists to generate a first relative value Avg, and a second relative value Avg2 respectively;
  a summing module having circuitry configured to add the first relative value and the second relative value and generate a first quantum, $q_1$;
  a subtraction module having circuitry configured to determine the absolute value of the difference between the relative values and generate a second quantum $q_2$; and
  an assignment module for assigning a process $P_i(n)$ from the first list to a first $CPU_1$ and a process $P_j(m)$ from the second list to a second $CPU_2$, where i=1, 2, . . . , n, j=1, 2, . . . , m and i+1=P;
  running, by the first $CPU_1$, the assigned process $P_i(n)$ of the first list when determined, by a comparator of the circuitry, that the burst time of the process $P_i(n)$ is less than the first quantum $q_1$ to generate an output $O_i$;
  if the burst time of the process $P_i(n)$ is greater than the first quantum, running the process $P_i(n)$ for a time equal to the first quantum $q_1$, and adding a remaining burst time of the process $P_i(n)$ to a tail of the first list
  running, by the second $CPU_2$, the assigned process $P_i(m)$ of the second list when determined, by the comparator of the circuitry, that the burst time of the process $P_i(m)$ is less than the second quantum $q_2$ to generate an output $O_j$; and
  if the burst time of the process $P_j(m)$ is greater than the second quantum $q_2$, running the process $P_j(m)$ for a time equal to the second quantum $q_2$, and adding a remaining burst time of the process $P_i(m)$ to a tail of the second list.

7. The scheduling system of claim 6, further comprising the comparator having circuitry configured to receive an output $O_i(n)$ and the burst time $B_i(n)$ for each $P_1(n)$ from the first $CPU_1$, compare the burst time $B_i(n)$ to the first quantum, $q_1$, and determine whether the burst time $B_i(n)$ is greater than the first quantum $q_1$;
  if the burst time $B_i(n)$ is greater than the first quantum $q_1$, calculate the remaining burst time $R_i(n)$ of the process $P_i(n)$ and add the remaining burst time $R_i(n)$ to the tail of the first list; and
  if the burst time $B_i(n)$ is less than the first quantum $q_1$, transmit the output $O_1(n)$ to an I/O port of the I/O device.

8. The scheduling system of claim 7, comprising the comparator having circuitry configured to receive an output $O_j(m)$ and the burst time $B_j(m)$ for each $P_j(m)$ from the first $CPU_2$, compare the burst time $B_j(m)$ to the second quantum, $q_2$, and determine whether the burst time $B_j(n)$ is greater than the second quantum $q_2$;
  if the burst time $B_j(m)$ is greater than the first quantum $q_2$, calculate the remaining burst time Rj(m) of the process Pj(m) and add the remaining burst time Rj(m) to the tail of the first list; and
  if the burst time Bj(m) is less than the second quantum $q_2$, transmit the output $O_j(m)$ to an I/O port of the I/O device.

9. The scheduling system of claim 8,
  wherein the assignment module continues to assign each next process $P_i(n)$ of the first list to $CPU_1$ and run each next process $P_i(n)$;
  wherein, if $P_i(n)$ terminates, the assignment module transmits the output $O_i(n)$ to an I/O port;
    if $P_i(n)$ does not terminate, the assignment module adds a remainder of $P_i(n)$ to the tail of the first list;
  the assignment module continues to assign and run each next process until $O_n$ outputs are generated;
  assigns each next process $P_j(m)$ of the second list to $CPU_2$ and runs each next process $P_j(m)$;
    if $P_j(m)$ terminates, the scheduler transmits the output $O_j(m)$ to an I/O port;
    if $P_j(m)$ does not terminate, the scheduler adds a remainder of $P_j(m)$ to the tail of the second list; and
  the assignment module continues to assign and run each next process until $O_m$ outputs are generated.

10. The scheduling system of claim 8,
  wherein a comparator connected to CPU1 and CPU2 makes the determination of whether an output is sent to an I/O port or a remainder of a process is added to the tail of the first or the second list.

11. The scheduling system of claim 8, wherein the assignment module simultaneously assigns a first process $P_1(n)$ from the first list to the first $CPU_1$ and a first process $P_1(m)$ from the second list to the second $CPU_2$.

12. A non-transitory computer readable medium having instructions stored therein that, when executed by one or more processor, cause the one or more processors to perform a method of scheduling in a dual core computer, comprising
  dividing, by a scheduler having circuitry including program instructions configured for calculating, a ready queue of P processes into a first list of n processes, P (n), and a second list of in processes, P (m), wherein each process in each list has a preassigned burst time and n+m=P;
  averaging the burst times of the n processes in the first list to generate a first relative value, $Avg_1$;
  averaging the burst times of the m processes in the second list to generate a second relative value $Avg_2$;
  adding the first relative value and the second relative value to generate a first quantum, $q_1$;
  subtracting the smaller of the relative values from the larger of the relative values to generate a second quantum, $q_2$;
  assigning, by a scheduler having program instructions configured for assigning quanta to the cores of the dual core computer, the first quantum $q_1$ to a first $CPU_1$;

assigning the second quantum $q_2$ to a second $CPU_2$;

assigning, by the scheduler, a process $P_i(n)$ of the first list to the first $CPU_1$ and a process $P_i(m)$ of the second list to the second $CPU_2$ simultaneously, where i=1, 2, ..., n;

running, by the first CPUs, the assigned process $P_i(n)$ of the first list when determined, by a comparator of the circuitry, that the burst time of the process $P_i(n)$ is less than the first quantum $q_1$, to generate an output $O_i$;

if the burst time of the process $P_i(n)$ is greater than the first quantum $q_1$, running the process $P_i(n)$ for a time equal to the first quantum $q_1$, and adding a remaining burst time of the process $P_1(n)$ to a tail of the first list running, by the second $CPU_2$, the assigned process $P_i(m)$ of the second list when determined, by the comparator of the circuitry, that the burst time of the process $P_i(m)$ is less than the second quantum $q_2$, to generate an output $O_j$; and if the burst time of the process $P_j(m)$ is greater than the second quantum $q_2$, running the process $P_j(m)$ for a time equal to the second quantum $q_2$, and adding a remaining burst time of the process $P_j(m)$ to a tail of the second list.

13. The non-transitory computer readable medium method of claim 12, further comprising assigning, by the scheduler, a second process, $P_{i+1}(n)$, to $CPU_1$;

running the second process, $P_{i+1}(n)$, until either the process ends and generates an output $O_{i+1}$ or the quantum q, expires;

transmitting the output $O_{i+1}$ to an I/O port if the process ends;

adding the remainder of the second process, $P_{i+1}(n)$, to the tail of the first list;

assigning each next process of the first list to $CPU_1$, running each next process of the first list, transmitting either the output to an I/O port or adding a remainder of next process to the tail of the first list, until $O_n$ outputs are generated.

14. The non-transitory computer readable medium method of claim 12, further comprising assigning, by the scheduler, a second process, $P_{j+1}(m)$, to $CPU_2$;

running the second process, $P_{j+1}(m)$, until either the process ends and generates an output $O_{j+1}$ or the quantum q2 expires;

transmitting the output $O_{j+1}$ to an I/O port if the process ends;

adding the remainder of the second process, $P_{j+1}(m)$, to the tail of the second list;

assigning each next process of the second list to $CPU_2$, running each next process of the second list, and transmitting either the output to an I/O port or adding a remainder of next process to the tail of the second list, until $O_m$, outputs are generated.

15. The non-transitory computer readable medium method of claim 12, further comprising assigning, by the scheduler, a first process $P_1(n)$ of the first list to the first $CPU_1$;

simultaneously assigning, by the scheduler, a first process $P_1(m)$ of the second list to the second $CPU_2$;

comparing, by using a comparator of the circuitry, the burst time of the process $P_1(n)$ to the first quantum $q_1$, if the burst time of the process $P_1(n)$ is less than the first quantum, running, by $CPU_1$, the process $P_1(n)$ to generate an output, $O_1(n)$;

if the burst time of the process $P_1(n)$ is greater than the first quantum, running the process $P_1(n)$ for a time equal to the first quantum, adding a remaining burst time of the process $P_1(n)$ to a tail of the first list, and assigning a second process $P_2(n)$ from the first list to $CPU_1$;

comparing, by using the comparator, the burst time of the process $P_1(m)$ of the second list to the second quantum $q_2$;

if the burst time of the process $P_1(m)$ is less than the second quantum, running, by $CPU_2$, the process $P_1(m)$ to generate an output, $O_j(m)$;

if the burst time of the process $P_1(m)$ is greater than the second quantum, running the process $P_1(m)$ for a time equal to the second quantum, adding a remaining burst time of the process $P_1(m)$ to a tail of the second list, and assigning a second process $P_2(m)$ from the second list to $CPU_2$.

16. The non-transitory computer readable medium method of claim 15, further comprising assigning each next process $P_i(n)$ of the first list to $CPU_1$;

running each next process $P_i(n)$;

if $P_i(n)$ terminates, transmitting the output $O_i(n)$ to an I/O port;

if $P_i(n)$ does not terminate, adding a remainder of $P_i(n)$ to the tail of the first list;

continuing to assign and run each next process until $O_n$ outputs are generated;

assigning each next process $P_j(m)$ of the second list to $CPU_2$;

running each next process $P_j(m)$;

if $P_j(m)$ terminates, transmitting the output $O_j(m)$ to an I/O port;

if $P_j(m)$ does not terminate, adding a remainder of $P_j(m)$ to the tail of the second list;

continuing to assign and run each next process until $O_m$ outputs are generated.

\* \* \* \* \*